US012572276B2

(12) United States Patent
Oikawa et al.

(10) Patent No.: US 12,572,276 B2
(45) Date of Patent: Mar. 10, 2026

(54) DATA COMPRESSION METHODS FOR BLOCK-BASED STORAGE SYSTEMS

(71) Applicant: Kioxia Corporation, Tokyo (JP)

(72) Inventors: Kohei Oikawa, Kawasaki (JP); Youhei Fukazawa, Kawasaki (JP); Keiri Nakanishi, Kawasaki (JP); Sho Kodama, Kamakura (JP); Takashi Takemoto, Yokohama (JP)

(73) Assignee: Kioxia Corporation, Tokyo (JP)

( * ) Notice: Subject to any disclaimer, the term of this patent is extended or adjusted under 35 U.S.C. 154(b) by 26 days.

(21) Appl. No.: 18/599,914

(22) Filed: Mar. 8, 2024

(65) Prior Publication Data

US 2024/0311003 A1 Sep. 19, 2024

(30) Foreign Application Priority Data

Mar. 17, 2023 (JP) ................................. 2023-043008

(51) Int. Cl.
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ....... G06F 3/0608; G06F 3/064; G06F 3/0673
See application file for complete search history.

(56) References Cited

U.S. PATENT DOCUMENTS 8,782,018 B2    7/2014   Shim et al.
9,048,862 B2    6/2015   Condict et al.

| | | | | |
|---|---|---|---|---|
| 10,044,370 B1 * | 8/2018 | Pasha et al. | ............ | H03M 7/30 |
| 10,452,616 B1 * | 10/2019 | Bassov | ................... | G06F 3/064 |
| 2010/0223237 A1 * | 9/2010 | Mishra | ................ | G06F 9/30174 |
| | | | | 707/693 |
| 2012/0130958 A1 * | 5/2012 | Kalach | .................... | G06F 16/13 |
| | | | | 707/687 |
| 2013/0006981 A1 * | 1/2013 | Shim | ...................... | G06F 40/242 |
| | | | | 707/736 |
| 2013/0290281 A1 * | 10/2013 | Yokoi | ................. | G06F 16/1744 |
| | | | | 707/693 |
| 2015/0370488 A1 * | 12/2015 | Watanabe | ............. | G06F 3/0608 |
| | | | | 711/103 |
| 2019/0065332 A1 * | 2/2019 | Ke | ......................... | G06F 3/0658 |
| 2021/0303156 A1 * | 9/2021 | Kachare | ................ | G06F 3/0608 |
| 2021/0303424 A1 * | 9/2021 | Jain | ..................... | G06F 11/2094 |
| 2021/0405882 A1 * | 12/2021 | Venkatasubbaiah | ......................... | |
| | | | | G06F 3/0641 |

(Continued)

FOREIGN PATENT DOCUMENTS

| | | | |
|---|---|---|---|
| JP | 2016-52046 A | 4/2016 |
| JP | 6614735 B1 | 12/2019 |
| JP | 2023-128936 A | 9/2023 |

*Primary Examiner* — Arpan P. Savla
*Assistant Examiner* — Jason Michael Pinga
(74) *Attorney, Agent, or Firm* — Oblon, McClelland, Maier & Neustadt, L.L.P.

(57) ABSTRACT

According to one embodiment, a memory controller includes a parameter table having entries which respectively correspond to superblock address ranges. The memory controller translates a logical address of data to be written to the memory into a superblock address, calculates compression parameters which correspond to items of data to be written to superblock addresses, writes the compression parameters to the parameter table, and compress data using the parameter table.

20 Claims, 13 Drawing Sheets

(56) References Cited

U.S. PATENT DOCUMENTS

| 2022/0164146 A1* | 5/2022 | Tsuruya | ................ | G06F 3/0688 |
| 2022/0239316 A1 | 7/2022 | Yamagiwa et al. | | |
| 2023/0152973 A1* | 5/2023 | Hwang | .............. | G06F 12/0246 |
| | | | | 711/103 |
| 2023/0283294 A1 | 9/2023 | Fukazawa et al. | | |

* cited by examiner

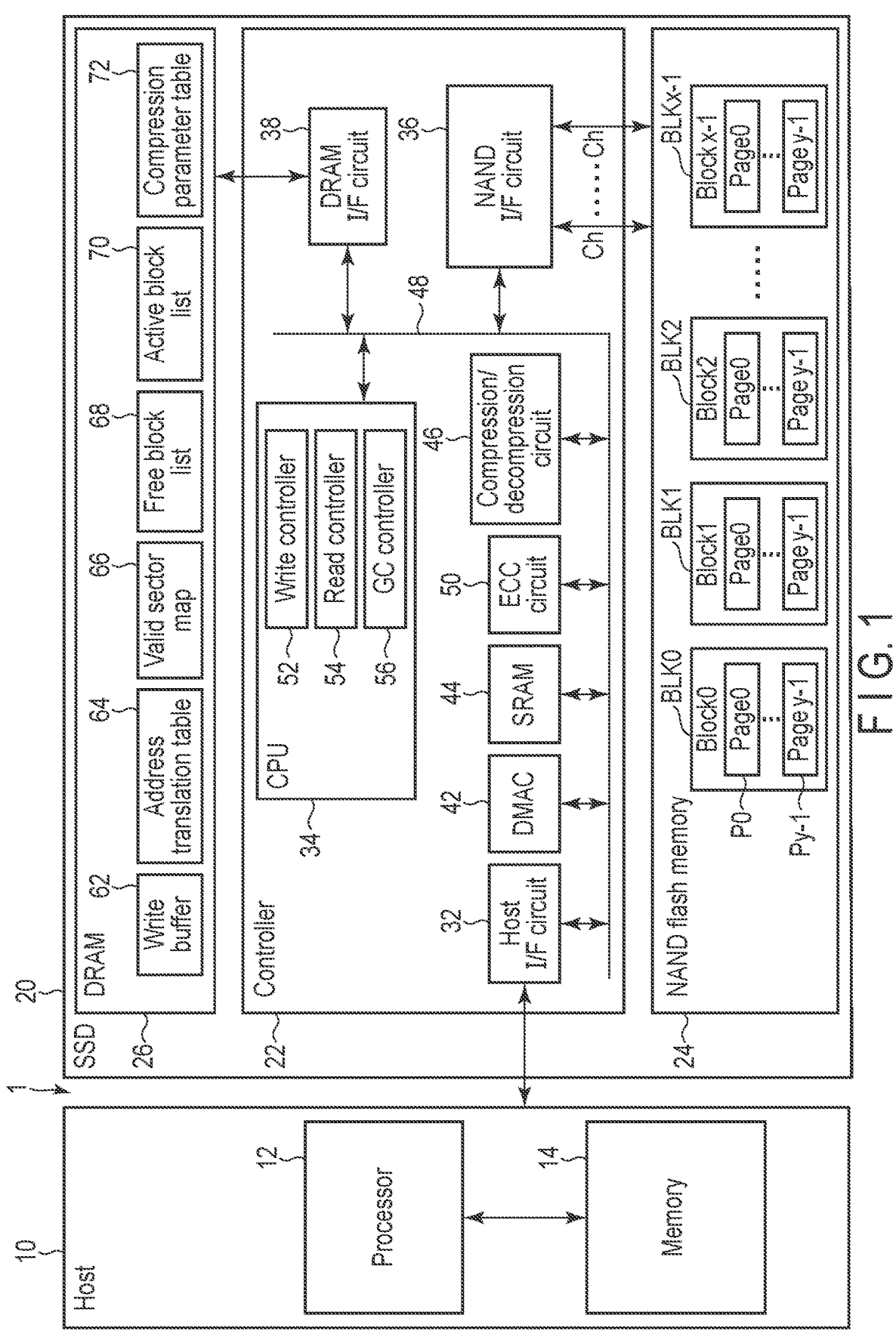
F I G. 1

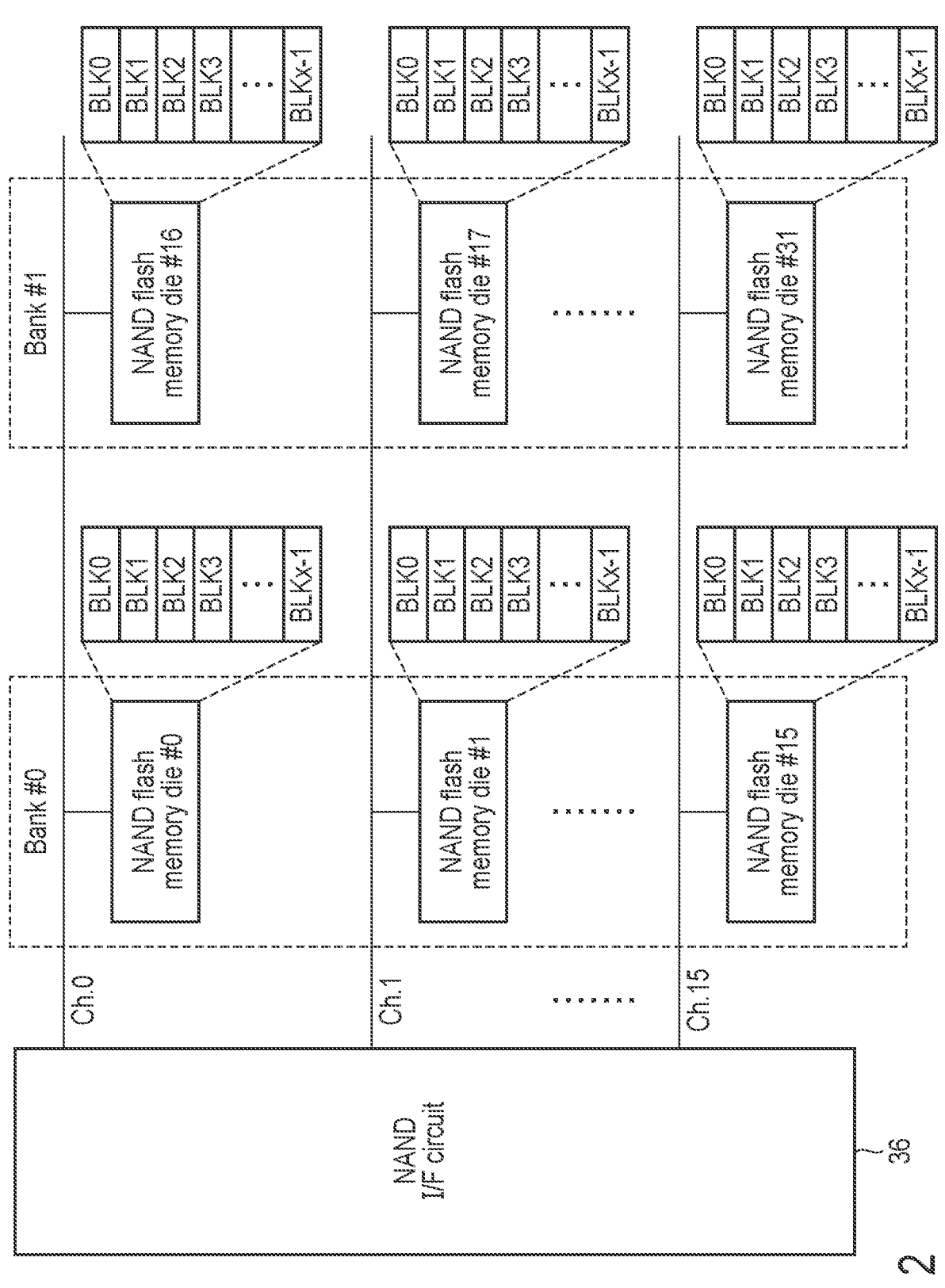
F I G. 2

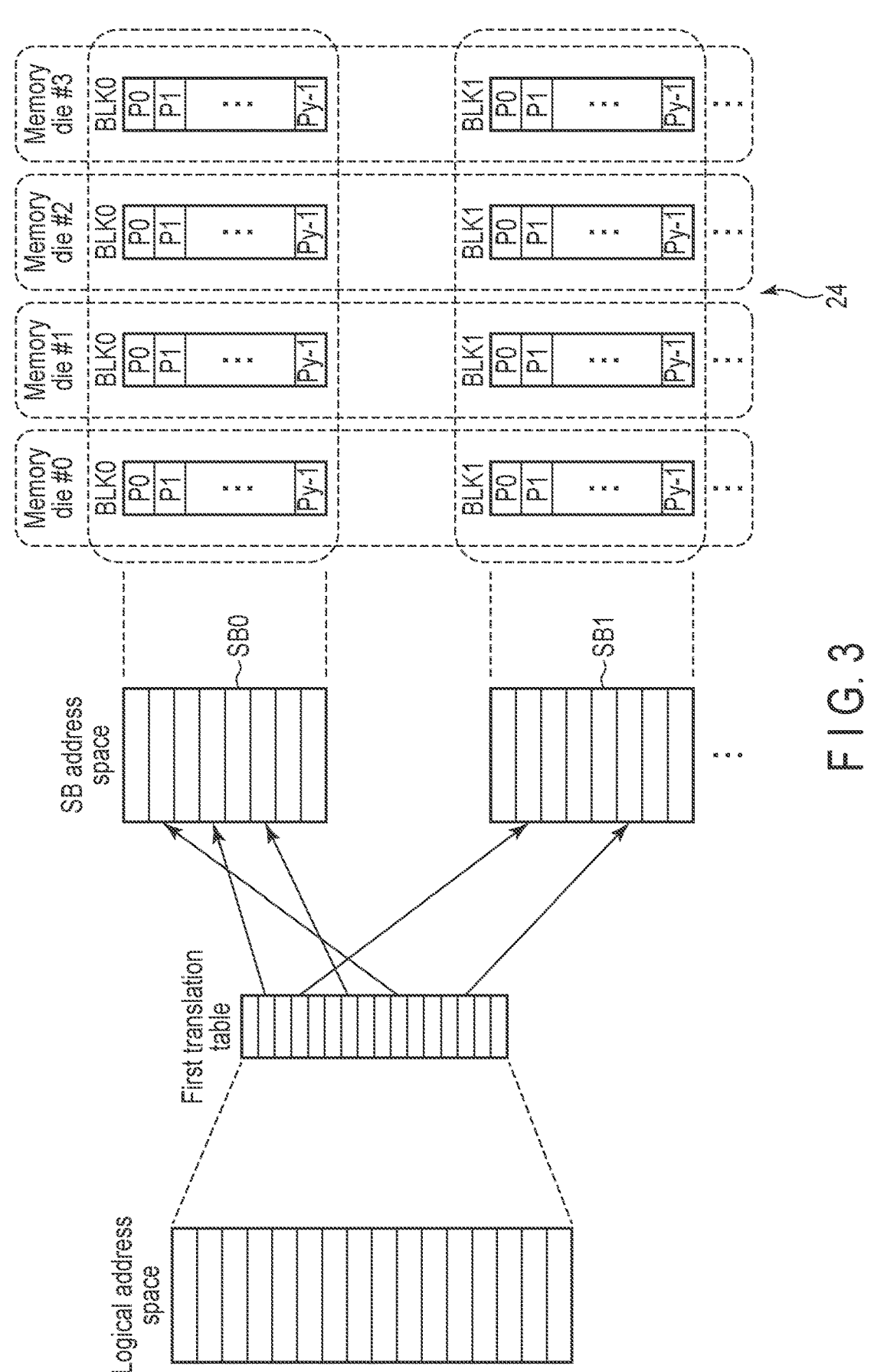
F I G. 3

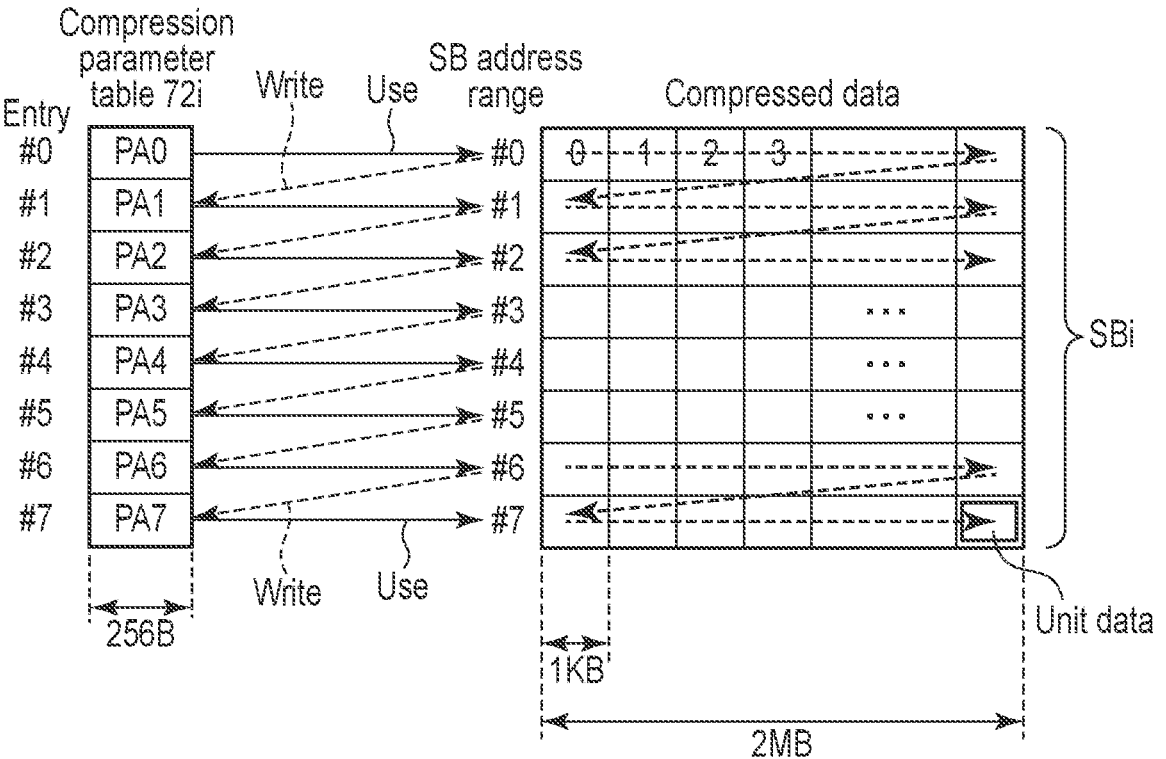
F I G. 4

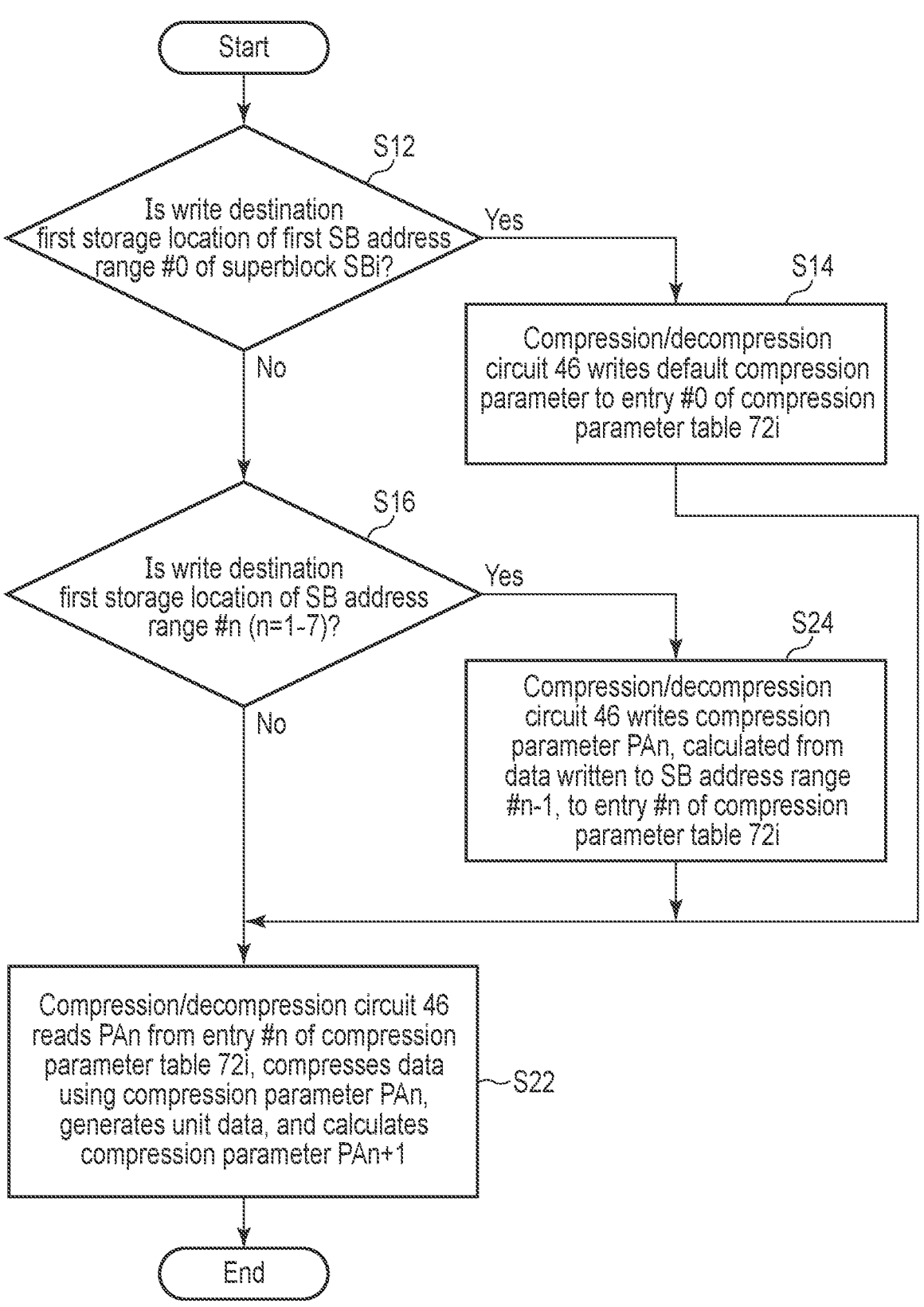
F I G. 5

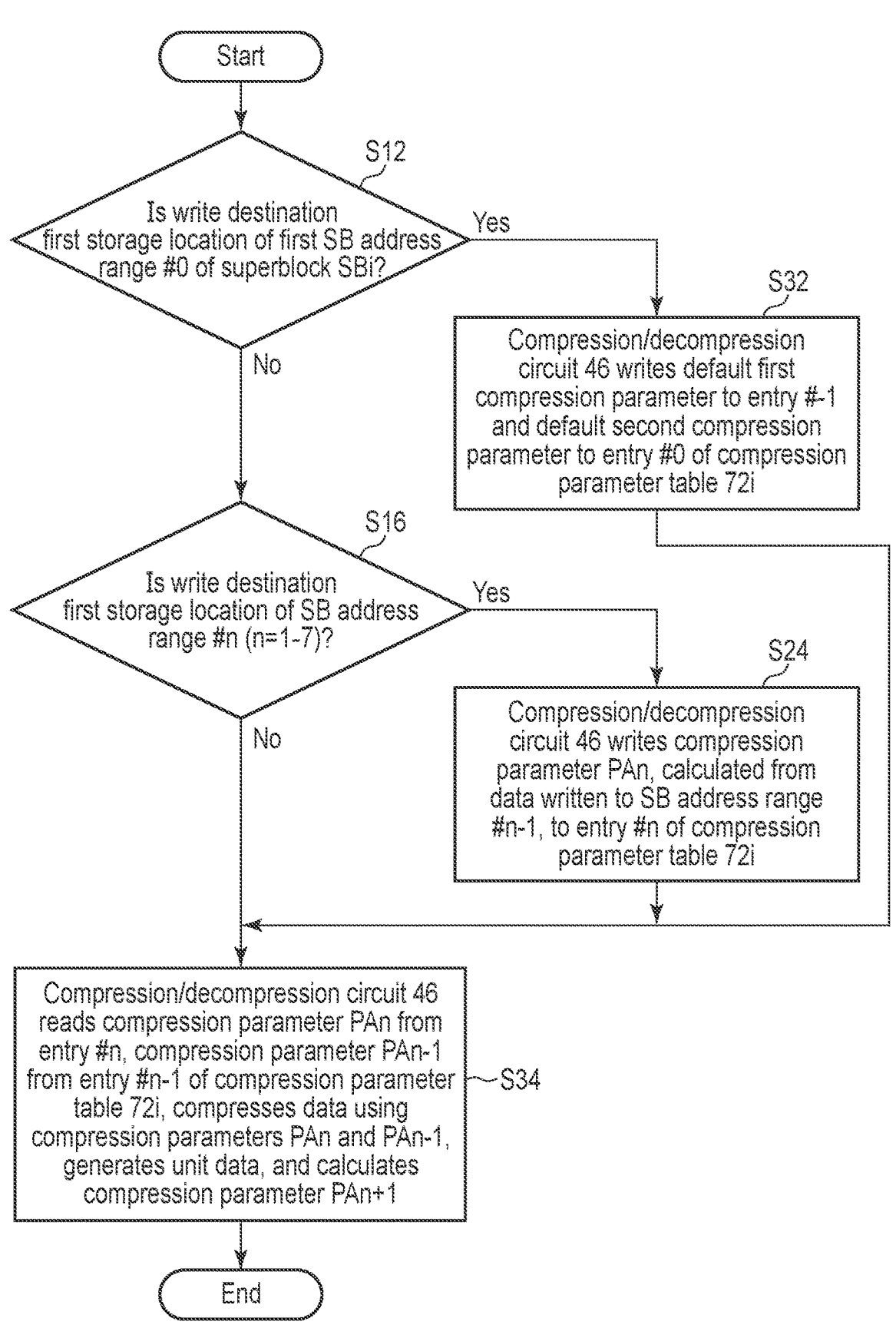
F I G. 7

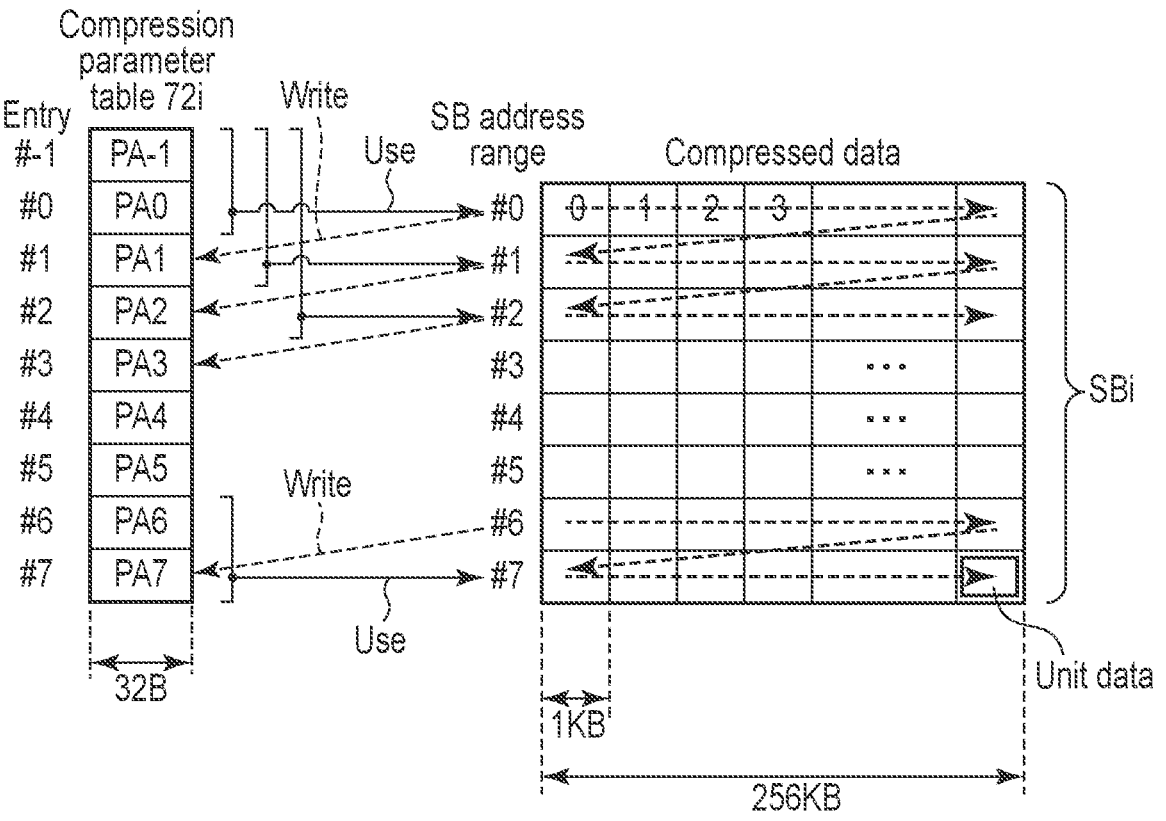
F I G. 8

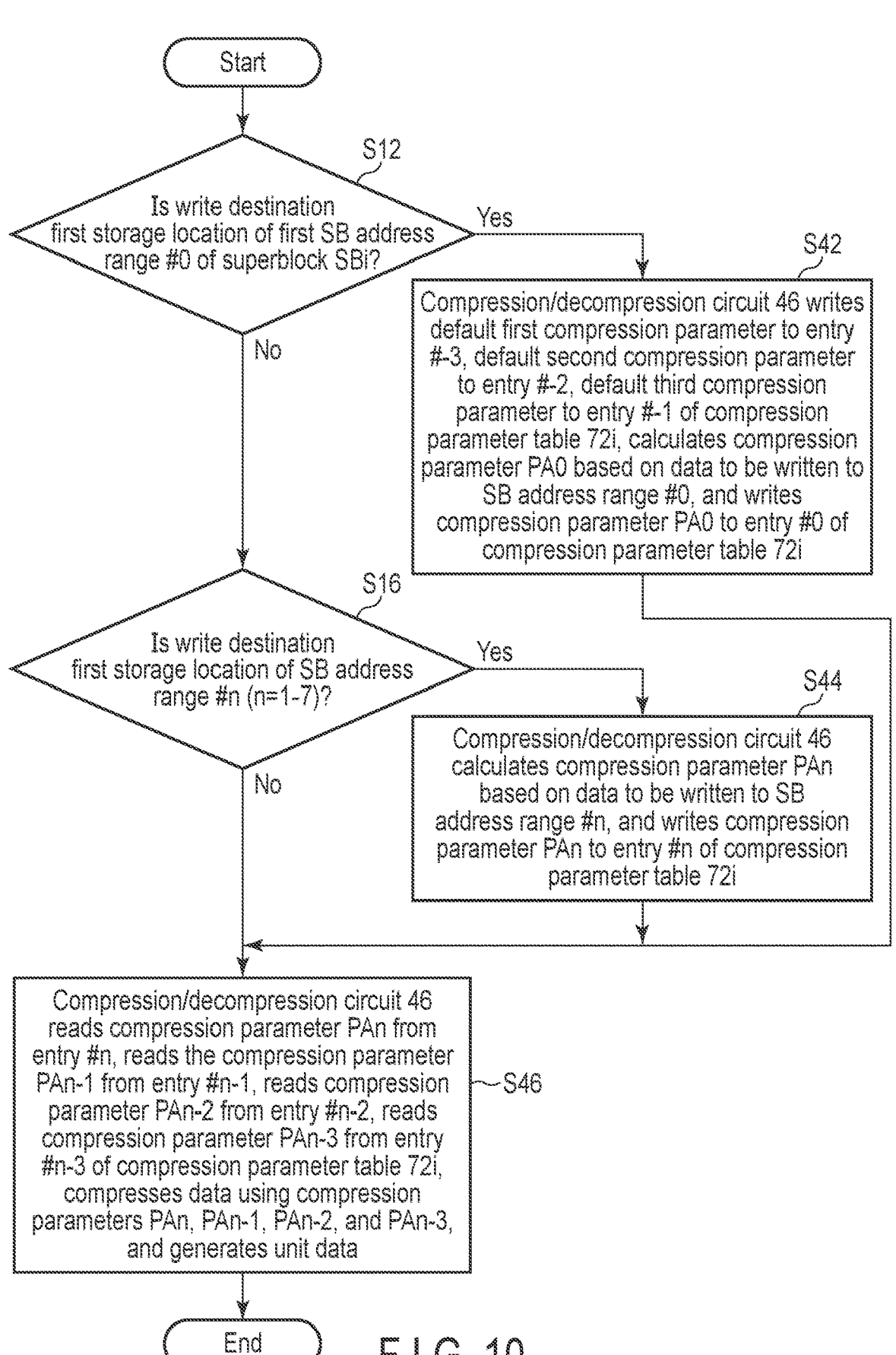
F I G. 10

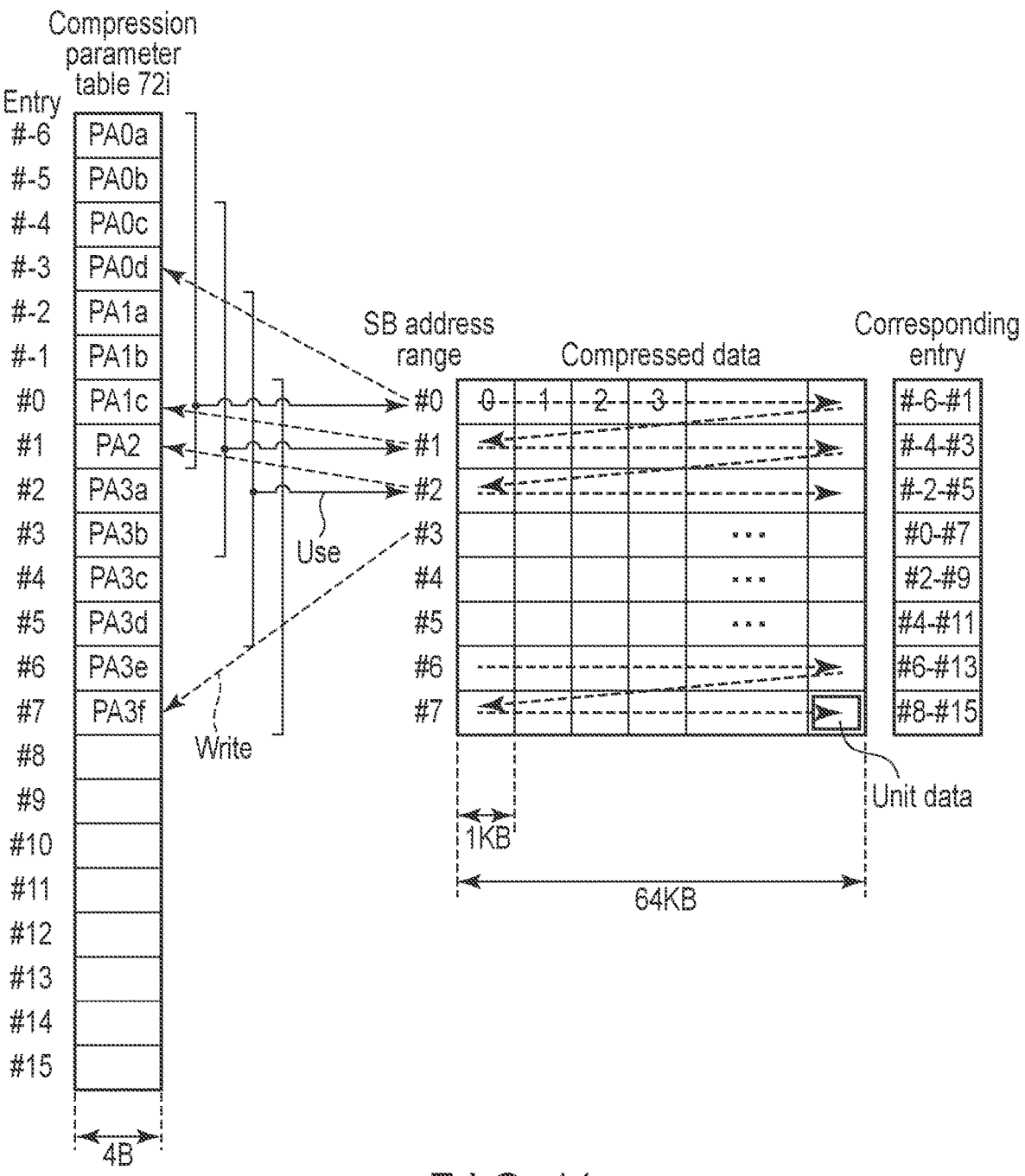
F I G. 11

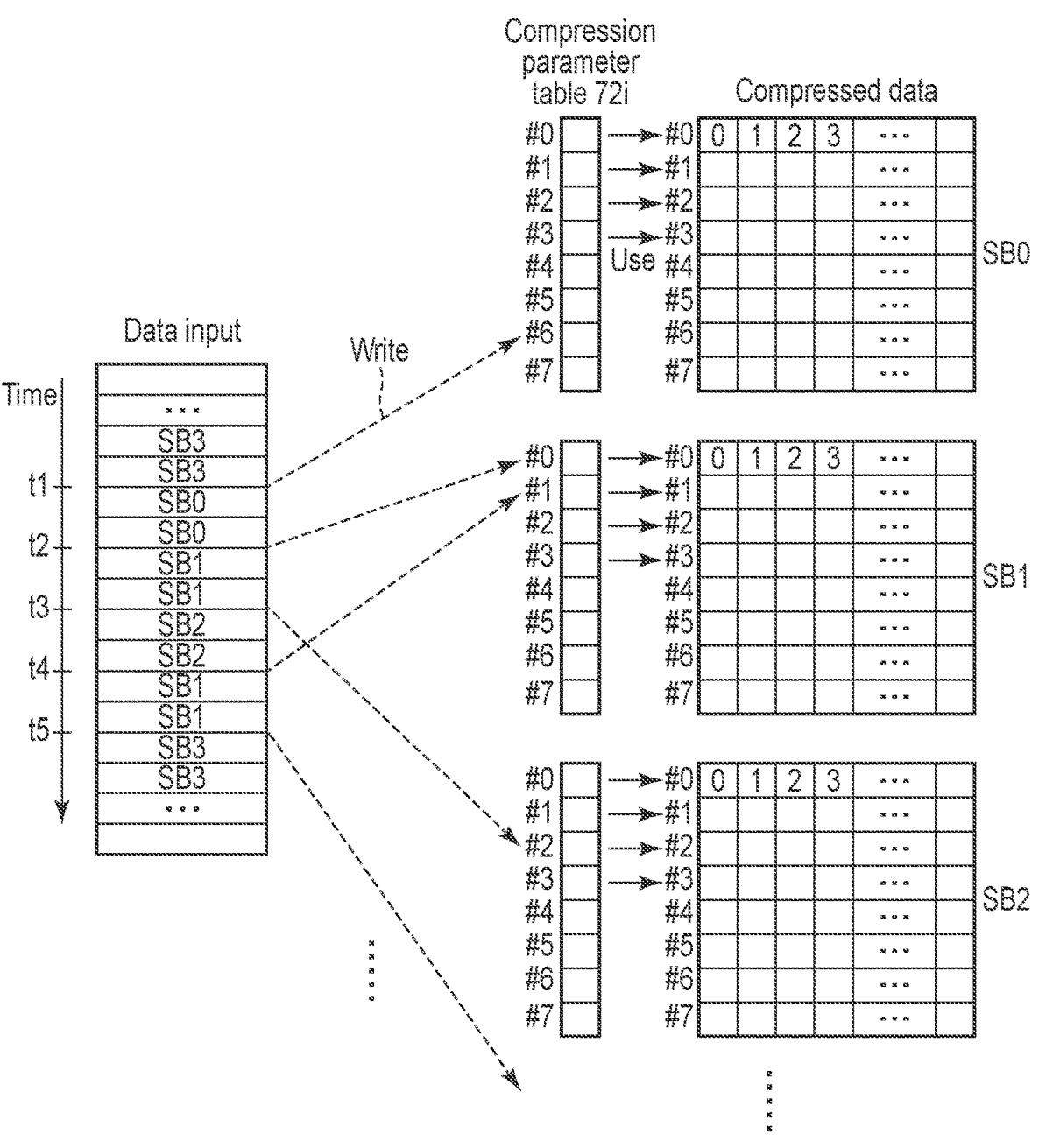
F I G. 13

DATA COMPRESSION METHODS FOR BLOCK-BASED STORAGE SYSTEMS

CROSS-REFERENCE TO RELATED APPLICATIONS

This application is based upon and claims the benefit of priority from Japanese Patent Application No. 2023-043008, filed Mar. 17, 2023, the entire contents of which are incorporated herein by reference.

FIELD

Embodiments described herein relate generally to a memory system and a method.

BACKGROUND

Memory systems having a compression device to compress input data and store the compressed data have been developed. If the size of data to be compressed is small, the compression device cannot compress data in a high compression ratio. For example, the access granularity of a solid-state drive (hereinafter referred to as an SSD) using a non-volatile memory is 4 KB or 512 B. The access granularity of a main memory or a compute express link (CXL) memory is 64 B or less. These access granularities are small as a unit of data processed by the compression device. In memory systems that process such a small unit of data, the compression ratio is low. It is thus difficult to compress data with a high compression ratio in memory systems with a small access granularity.

The compression device compresses input data using a compression parameter. Using compression parameters determined for each data to be compressed, data can be compressed with a high compression ratio even in memory systems with a small access granularity.

An example of the compression parameters is an initial dictionary in a dictionary compression device. If the dictionary compression device compresses a character string that matches data (e.g., a character string) that occurred in the past, it replaces the character string with a symbol indicating that the character string has matched the past data (character string). In addition, the dictionary compression device prepares a set of character strings (initial dictionary) expected to occur to compress the character strings.

An example of application of the initial dictionary is to have an initial dictionary tailored to an application for processing data to be compressed.

Another example of the application is to analyze data to be compressed and generate an initial dictionary based on a result of the analysis and then compress the data.

The former example is difficult to be applied to memory systems that process general-purpose data. The latter example is characterized by the fact that the throughput is easy to lower because of two accesses to data.

BRIEF DESCRIPTION OF THE DRAWINGS

FIG. 1 is a block diagram illustrating an information processing system including an example of a memory system according to a first embodiment.

FIG. 2 is a block diagram showing an example of the relationship between a plurality of channels and a plurality of NAND flash memory dies according to the first embodiment.

FIG. 3 is a diagram illustrating an example of address translation according to the first embodiment.

FIG. 4 is a diagram illustrating an example of a compression process of the compression/decompression circuit according to the first embodiment.

FIG. 5 is a flowchart illustrating an example of a compression process according to the first embodiment.

FIG. 7 is a flowchart illustrating an example of a compression process according to the second embodiment.

FIG. 8 is a diagram illustrating an example of a compression process according to a modification to the second embodiment.

FIG. 10 is a flowchart illustrating an example of a compression process according to the third embodiment.

FIG. 11 is a diagram illustrating an example of a compression process according to the fourth embodiment.

FIG. 13 is a diagram illustrating an example of calculation of compression parameter according to the fifth embodiment.

DETAILED DESCRIPTION

Figure 6:
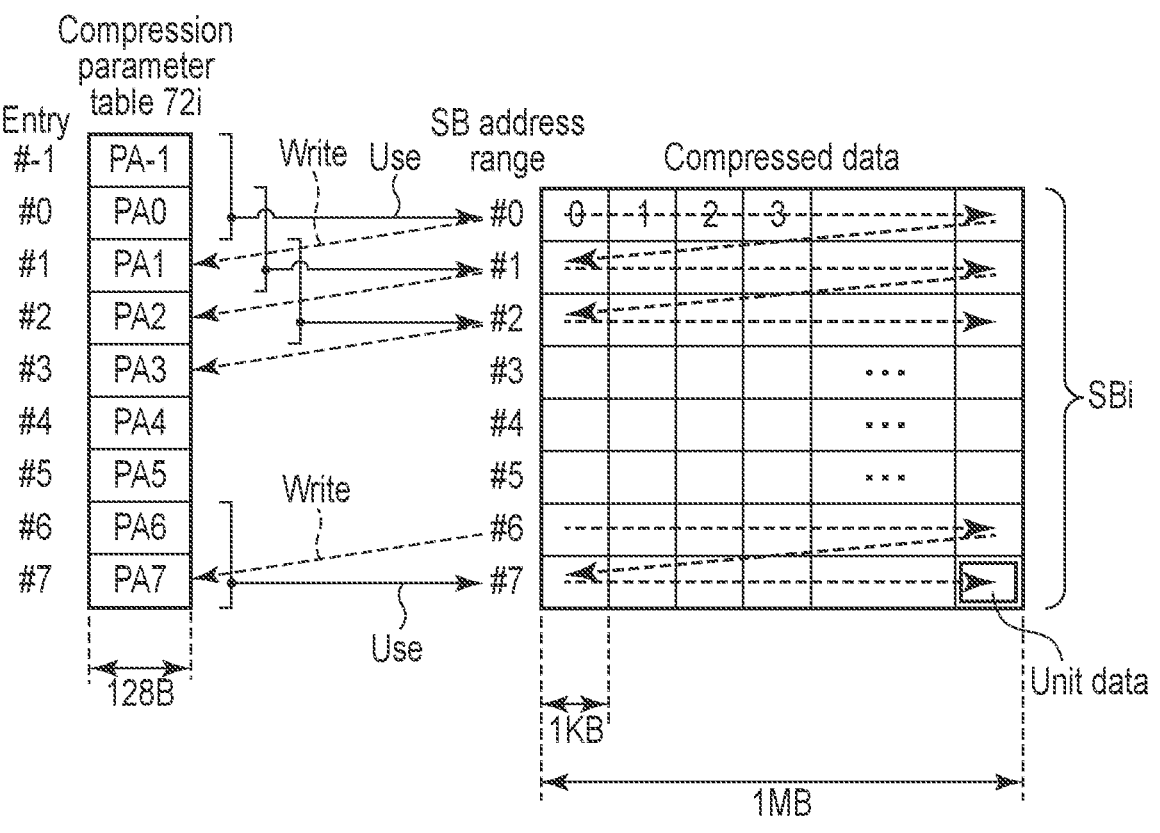
FIG. 6 is a diagram illustrating an example of the compression process according to the second embodiment.

Embodiments will be described below with reference to the drawings. In the following descriptions, a device and a method are illustrated to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and ratio. Elements corresponding to each other are denoted by the same reference numeral and their overlapping descriptions may be omitted. Some elements may be denoted by different names, and these names are merely an example. It should not be denied that one element is denoted by different names. Note that "connection" means that one element is connected to another element via still another element as well as that one element is directly connected to another element. If the number of elements is not specified as plural, the elements may be singular or plural.

First Embodiment

FIG. 1 is a block diagram illustrating an information processing system 1 including an example of a memory system according to a first embodiment. For example, the memory system is an SSD, a hard disk drive, or a magnetic tape. In the first embodiment, the memory system is implemented as an SSD 20. The information processing system 1 includes a host device (hereinafter referred to as a host) 10 and the SSD 20.

The host 10 is an information processing device that controls the operation of the SSD 20. For example, the information processing device is a personal computer, a server computer, or various other computing devices. The host 10 transmits a write request to the SSD 20 to write data. The host 10 transmits a read request to the SSD 20 to read data.

The host 10 includes a processor 12 and a memory 14. The processor 12 is a central processing unit (CPU) that is configured to control the operation of components (not shown) in the host 10. The processor 12 executes software (host software) that is loaded into the memory 14 from the SSD 20 or a storage device in the host 10. For example, the host software is an operating system, a file system, a device driver, or an application program.

The memory 14 is a main memory provided in the host 10. The memory 14 is a volatile semiconductor memory. Data stored in the volatile semiconductor memory is lost if power supply is stopped. The memory 14 is implemented by a random access memory such as a dynamic random access memory (DRAM).

The SSD 20 is a semiconductor storage device configured to receive a write request and a read request from the host 10 and write data to and read data from the non-volatile memory based on the received write request and read request. The non-volatile memory is a semiconductor memory device that can store data even after power supply is stopped. For example, the non-volatile memory is a NAND flash memory, a magnetoresistive RAM, a resistance random access memory, a ferroelectric memory, or a phase-change memory. In the first embodiment, the non-volatile memory is implemented by a NAND flash memory.

The SSD 20 is connectable to the host 10. The SSD 20 is built in the information processing device, for example. The SSD 20 may be connected to the information processing device via a cable or a network.

For example, Serial Attached SCSI (SAS), Serial ATA (SATA), or NVM Express™ (NVMe™) can be used as a logical interface standard for connecting the host 10 and the SSD 20.

The SSD 20 includes a controller 22 and a non-volatile memory (e.g., NAND flash memory) 24. The SSD 20 may include a DRAM 26 as a random access memory.

The controller 22 is a memory controller configured to control the NAND flash memory 24. The controller 22 may be implemented by a circuit such as a system-on-a-chip (SoC). The controller 22 is electrically connected to the NAND flash memory 24 via a memory bus called channel Ch.

The NAND flash memory 24 includes a memory cell array. The memory cell array includes a plurality of memory cells arranged in a matrix. The memory cell array includes a plurality of blocks BLK0 to BLKx−1. Each of the blocks BLK0 to BLKx−1 is a unit of data erase operation. Each of the blocks BLK0 to BLKx−1 is also referred to as a physical block or a flash block.

Each of the blocks BLK0 to BLKx−1 includes a plurality of pages P0 to Py−1. Each of the pages P0 to Py−1 includes a plurality of memory cells connected to the same word line. Each of the pages P0 to Py−1 is a unit of data write operation and data read operation.

The NAND flash memory 24 may include a plurality of NAND flash memory dies (or NAND flash memory chips). Each of the NAND flash memory dies may be a flash memory having a two-dimensional structure or a flash memory having a three-dimensional structure.

The DRAM 26 is used, for example, to temporarily store data to be written to the NAND flash memory 24. The storage area of the DRAM 26 is used to store various items of management data used by the controller 22. A part of the storage area of the DRAM 26 is used as a write buffer 62 that temporarily stores write data associated with one or more write requests received from the host 10. Another part of the storage area of the DRAM 26 is used as a storage area that stores an address translation table 64, a valid sector map 66, a free block list 68, an active block list 70, and a compression parameter table 72.

The address translation table 64, valid sector map 66, free block list 68, active block list 70, and compression parameter table 72 may be loaded from the DRAM 26 into the NAND flash memory 24 in response to the cutoff of power supply to the SSD 20. The address translation table 64, valid sector map 66, free block list 68, active block list 70, and compression parameter table 72 may be loaded from the NAND flash memory 24 into the DRAM 26 in response to the supply of power to the SSD 20.

Next is a detailed description of the configuration of the controller 22.

The controller 22 includes a host interface (I/F) circuit 32, a CPU 34, a NAND interface (I/F) circuit 36, a DRAM interface (I/F) circuit 38, a direct memory access controller (DMAC) 42, a static RAM (SRAM) 44, a compression/decompression circuit 46 and an error correction encoding/decoding circuit (ECC circuit) 50.

The host I/F circuit 32, CPU 34, NAND I/F circuit 36, DRAM I/F circuit 38, DMAC 42, SRAM 44, compression/decompression circuit 46, and ECC circuit 50 are interconnected via a bus 48.

The host I/F circuit 32 is configured to communicate with the host 10. The host I/F circuit 32 receives various requests from the host 10. The requests contain a write request, a read request, and the like. For the write and read requests, a logical address is specified. The logical address is an address used by the host 10 to access the SSD 20. For example, LBA (logical block address) is used as the logical address.

The write request is a request to write data to be written (write data) to the NAND flash memory 24. The write request includes, for example, a logical address (start logical address: start LBA) indicating a first sector of write data, a data size of the write data, and a data pointer (buffer address) indicating a storage location of data in the memory 14 of the host 10 that stores the write data.

The data size of the write data may be specified, for example, by the number of sectors. One sector corresponds to the minimum data size of write data that can be specified by the host 10. Thus, the data size of the write data is represented by a multiple of the sectors.

In the first embodiment, the write data written to the NAND flash memory 24 in accordance with a write request from the host 10 is also referred to as user data.

The read request is a request to read data from the SSD 20. The read request includes a logical address (start LBA) indicating a first sector of data (read target data), a data size of the read target data and a data pointer (buffer address) indicating a storage location of data in the memory 14 of the host 10 to which the read target data is to be transferred.

The CPU 34 is a processor configured to control the host I/F circuit 32, NAND I/F circuit 36, DRAM I/F circuit 38, DMAC 42, SRAM 44, and compression/decompression circuit 46.

The CPU 34 loads a control program (firmware) from the NAND flash memory 24 or a ROM (not shown) into the DRAM 26 in response to the supply of power to the SSD 20. The CPU 34 may function as a flash translation layer (FTL) configured to execute the firmware and thus perform data management and block management of the NAND flash memory 24. The data management performed by the FTL includes (1) management of mapping information indicating the correspondence between each logical address and each physical address of the NAND flash memory 24, (2) processing for concealing constraints (e.g., read/write operation for each page and erase operation for each block) of the NAND flash memory 24, and the like.

The CPU 34 manages mapping between each logical address and each physical address using the address translation table 64. The physical address corresponding to a certain logical address indicates a storage location (physical storage location) in the NAND flash memory 24 to which data corresponding to the logical address is written.

The data management performed by the FTL also includes management of valid data and invalid data. The CPU 34 manages a plurality of valid data identifiers, which correspond to their respective storage locations included in each of the blocks BLK0 to BLKx−1 in the NAND flash memory 24, for each of the blocks using a management table.

Each of the valid data identifiers indicates validity or invalidity of data stored in its corresponding storage location. The valid data identifiers corresponding to each block are referenced as a valid sector map 66. The valid sector map 66 corresponding to one block includes the same number of valid data identifiers as the number of storage locations (sectors) included in the one block BLK. The block BLK corresponding to one valid sector map 66 is, for example, a physical block. Alternatively, the block BLK corresponding to one valid sector map 66 may be a block group (superblock), which will be described later with reference to FIG. 3.

Each of the valid data identifiers is represented by a 1-bit flag. Thus, the valid sector map 66 is also referred to as bitmap data. Each of the valid data identifiers is also referred to as a bitmap flag.

The valid data is the latest data associated with a logical address. If data corresponding to a certain logical address is written to the NAND flash memory 24, it is valid data.

If update data corresponding to a certain logical address is written to the NAND flash memory 24, the written data is valid data. Old data remaining in the NAND flash memory 24 is treated as invalid data. Data corresponding to a logical address specified by invalidation request from the host 10 is also treated as invalid data.

The block management performed by the FTL includes bad block management, wear leveling, and garbage collection (also referred to as compaction).

The wear leveling is an operation to equalizing the number of rewrites (the number of program/erase cycles) of each block.

The garbage collection is an operation to reduce the number of blocks which stores valid data and invalid data and to increase the number of free blocks. In the garbage collection, the CPU 34 selects a copy source block from the blocks which stores valid data and invalid data, and copies the valid data stored in the copy source block to a copy destination block. If all the valid data in the copy source block is completely copied to the copy destination block, the copy source block is changed to a free block containing no valid data and can be reused for writing data.

The block management performed by the FTL also includes management of free blocks and active blocks. The active blocks store valid data. The CPU 34 manages each free block using the free block list 68. In addition, the CPU 34 manages each active block using the active block list 70.

The NAND I/F circuit 36 is a memory control circuit configured to control the NAND flash memory 24 under the control of the CPU 34. Communications between the NAND I/F circuit 36 and the NAND flash memory 24 are carried out in conformity with, for example, a Toggle NAND flash interface or an open NAND flash interface (ONFI).

The DRAM I/F circuit 38 is a DRAM control circuit configured to control the DRAM 26 under the control of the CPU 34.

The DMAC 42 transfers data between the memory 14 of the host 10 and the DRAM 26 (or SRAM 44) under the control of the CPU 34. If write data is to be transferred from the memory 14 of the host 10 to the write buffer 62, the CPU 34 specifies for the DMAC 42 a transfer source address indicating a location in the memory 14 of the host 10, a size of the write data to be transferred, and a transfer destination address indicating a location in the write buffer 62.

During writing, the compression/decompression circuit 46 compresses uncompressed data, which is transmitted from the host 10, using compression parameters managed by the compression parameter table 72 to generate compressed data. The ECC circuit 50 adds an error correction code to the compressed data to generate encoded data. The encoded data is written to the NAND flash memory 24.

During reading, the NAND flash memory 24 reads encoded data. The ECC circuit 50 corrects an error of the encoded data using the error correction code added to the encoded data. The compression/decompression circuit 46 decompresses the encoded data whose error has been corrected, using the compression parameters managed by the compression parameter table 72 to generate uncompressed data. The uncompressed data is transmitted to the host 10.

A part or all of the compression/decompression circuit 46 may be implemented by software. A part or all of the ECC circuit 50 may be implemented by software.

The CPU 34 can function as a write controller 52, a read controller 54, and a garbage collection controller (GC controller) 56.

Some or all of the write controller 52, read controller 54, and GC controller 56 may be implemented by dedicated hardware in the controller 22.

Upon receipt of a write request from the host 10, the write controller 52 writes data associated with the write request (write data) to a write destination block. The write destination block means a block allocated as a block used to write data from the host 10. The write controller 52 can write not only the write data but also the LBA specified by the write request to the write destination block.

The write controller 52 updates the address translation table 64 such that the physical address indicating a storage location in the write destination block to which the write data is written is associated with the LBA specified by the write request. The write controller 52 also updates a valid data identifier in the valid sector map 66, which corresponds to a storage location in the write destination block to which the write data is written, to a value indicating validity.

Upon receipt of a read request from the host 10, the read controller 54 refers to the address translation table 64 to acquire from the address translation table 64 a physical address associated with the LBA specified by the read request. Based on the acquired physical address, the read controller 54 reads both data and its corresponding LBA from a storage location in a block specified by the physical address. The LBA read with the data is used to verify that the read data corresponds to the LBA specified by the read request.

When executing garbage collection of the NAND flash memory 24, the GC controller 56 selects one or more copy source blocks (GC source blocks) for the garbage collection from among a plurality of blocks of the NAND flash memory 24. In the copy source block selection, for example, a GC policy of preferentially selecting an active block with the smallest amount of valid data as a copy source block may be used or another GC policy may be used. The copy source block is a GC target block for which garbage collection operation is performed.

The GC controller 56 specifies valid data in the selected copy source block on the basis of the valid data identifiers in the valid sector map 66 which correspond to their respective storage locations in the selected copy source block. Then, the GC controller 56 copies both the valid data and its corresponding LBA from the copy source block to the copy destination block (GC destination block) for garbage collection.

The GC controller 56 updates the address translation table 64 such that a physical address indicating a copy destination storage location in the copy destination block to which the valid data is copied is associated with the LBA corresponding to the copied valid data.

The copy source block stores a pair of valid data and LBA. Thus, the GC controller 56 can easily specify the LBA corresponding to the valid data. As a result, the GC controller 56 can easily associate a physical address, which indicates a copy destination storage location in the copy destination block to which the valid data is copied, with the LBA corresponding to the valid data.

In addition, the GC controller 56 updates a valid data identifier in the invalid sector map 66, which corresponds to a copy source storage location in the copy source block which stores the valid data, to a value indicating invalidity. The GC controller 56 also updates a valid data identifier in the valid sector map 66, which corresponds to a copy destination storage location in the copy destination block, to a value indicating validity.

When all valid data in the copy source block and all LBAs corresponding to the valid data are completely copied, the copy source block can be reused for data write. That is, if a garbage collection operation is performed for a block, the block becomes a free block. Thus, the block for which the garbage collection operation is performed is reused as a write destination block.

The configuration of the NAND flash memory 24 including a plurality of NAND flash memory dies will be described below. FIG. 2 is a block diagram showing an example of the relationship between a plurality of channels and a plurality of NAND flash memory dies, which is used in the memory system according to the first embodiment.

The NAND flash memory dies can operate independently from one another. Thus, the NAND flash memory dies are each treated as a unit capable of parallel operation. In the case of FIG. 2, sixteen channels Ch.0 to Ch.15 are connected to the NAND I/F circuit 36 and two NAND flash memory dies are connected to each of the sixteen channels Ch.0 to Ch.15.

In this case, 16 NAND flash memory dies #0 to #15 connected to the channels Ch.0 to Ch.15 may be configured as bank #0 and the remaining 16 NAND flash memory dies #16 to #31 connected to the channels Ch.0 to Ch.15 may be configured as bank #1. The banks are each treated as a unit for operating a plurality of memory dies in parallel by bank interleaving. In the configuration example of FIG. 2, a maximum of 32 NAND flash memory dies can be operated in parallel by 16 channels and bank interleaving using two banks.

Erase operation may be performed in units of a single block BLK or in units of a block group including a set of a plurality of blocks BLK operable in parallel. The block group is also referred to as a superblock.

The configuration of one block group, that is, one super-block including a set of a plurality of blocks BLK is not limited thereto but may include a total of 32 blocks BLK selected one by one from the NAND flash memory dies #0 to #31.

FIG. 3 is a diagram illustrating an example of address translation according to the first embodiment. In FIG. 3, for simplicity of description, the NAND flash memory 24 includes four memory dies #0 to #3. The blocks BLK included in the NAND flash memory 24 belong to one of a plurality of superblocks SB0, SB1 . . . . One superblock (for example, SB0) corresponds to blocks BLK0 of four memory dies #0 to #3. The address (physical address) of the blocks includes SB address and identification information of the memory dies.

The logical address handled by the host 10 is translated to a superblock address (SB address) by a first translation table included in the address translation table 64. The SB address is translated to a physical address of the NAND flash memory 24. The SB address may be translated to a physical address that is determined uniquely by the SSD 20. Alternatively, the SB address may be translated to a physical address by a second translation table other than the first translation table included in the address translation table 64.

The address space of the superblock (SB address space) is separated by a plurality of superblocks SB0, SB1 . . . . Like the blocks BLK, the superblocks each include a plurality of pages. Like in the blocks BLK, in the superblocks, data needs to be written in order to consecutive pages. The superblocks are the same as the blocks BLK in that data is erased in units of blocks. In the superblocks, a physical storage location in the pages (which will be referred to simply as a storage location hereinafter) is abstracted.

FIG. 4 is a diagram illustrating an example of a compression process of the compression/decompression circuit 46 according to the first embodiment. FIG. 4 shows the correspondence between the compression parameter table 72i stored in the DRAM 26 and the compressed data stored in the SB address space of one superblock SBi of the NAND flash memory 24. In FIG. 4, "i" is an integer greater than or equal to 0. The correspondence will be described below using specific figures for the sake of clarity, but it is not limited to the figures.

The compression parameter table 72i is formed for each superblock SB. The data size of the superblock SB is 16 megabytes (16 MB). The storage location range of the superblock SB is specified by 8 superblock address ranges (SB address ranges) #0 to #7. The data size stored in one SB address range is 2 megabytes (2 MB).

The compression parameter table 72i includes eight entries #0 to #7 corresponding to their respective 8 SB address ranges #0 to #7 of the superblock SBi. The compression parameters PA0 to PA7 corresponding to their respective SB address ranges #0 to #7 are stored in their respective entries #0 to #7 of the compression parameter table 72i. For example, the entry #0 stores the compression parameter PA0 used to compress data stored in the SB address range #0. The data size of the compression parameter is 256 bytes (256 B). An example of the compression parameter is an initial dictionary in dictionary compression.

The SSD 20 compresses data from the host 10 to generate compressed data of a fixed size, e.g., 1 kilobyte (1 KB) (referred to as unit data). The compression ratio of the data is not constant. The SSD 20 compresses a plurality of items of uncompressed data each having 256 B as much as possible to generate 1 item of compressed data under the condition that the size of the compressed data is 1 KB or smaller. One SB address range includes storage locations of a plurality of items of unit data. The size of unit data is 1 KB. The SSD 20 writes unit data to the NAND flash memory 24 in the order indicated by the broken line in FIG. 4. Specifically, the SSD 20 writes unit data to the first storage location, second storage location . . . of the first SB address range #0 of the superblock SBi. When the SSD 20 writes the unit data to the last storage location of the first SB address range #0 of the superblock SBi, it writes the unit data to the first storage location, second storage location . . . of the second SB address range #1. Similarly, the SSD 20 writes unit data to the first storage location, second storage location . . . of the last SB address range #7 of the superblock SBi.

The compression/decompression circuit 46 compresses uncompressed data, which is to be written to the SB address range #n (n=0-7) of the superblock SBi, using the compression parameter PAn stored in the entry #n of the compression parameter table 72i to generate unit data. The unit data is written to the storage location of the NAND flash memory 24 specified by the SB address range #n of the superblock SBi. The unit data may be written to the NAND flash memory 24 each time it is generated. Alternatively, after one item of data is completely compressed, the generated unit data items may collectively be written to the NAND flash memory 24.

FIG. 5 is a flowchart illustrating an example of a compression process in which the compression/decompression circuit 46 according to the first embodiment generates one item of unit data. FIG. 5 illustrates a compression process of generating one item of unit data. When the controller 22 receives a write request from the host 10, the CPU 34 causes the compression/decompression circuit 46 to start a compression process.

The compression/decompression circuit 46 determines whether the write destination of data to be compressed is the first storage location (the leftmost storage location in the example of FIG. 4) of the first SB address range #0 of the superblock SBi (S12).

If the write destination is the first storage location of the first SB address range #0 of the superblock SBi (Yes in S12), the compression/decompression circuit 46 writes the default compression parameter to the entry #0 of the compression parameter table 72i (S14). If unit data has been written to another superblock (e.g., SBj (j≠i)) before the unit data is written to the superblock SBi, a compression parameter determined during the process for the SB address range of the superblock SBj in which the unit data was last written, may be used as the default compression parameter.

If the write destination is not the first storage location of the first SB address range #0 of the superblock SBi (No in S12), the compression/decompression circuit 46 determines whether the write destination is the first storage location (the leftmost storage location in the example of FIG. 4) of the SB address range #n (n=1-7) (S16).

If the write destination is not the first storage location of the SB address range #n (No in S16), the compression/decompression circuit 46 reads the compression parameter PAn from the entry #n of the compression parameter table 72i corresponding to the SB address range #n, compresses the data using the compression parameter PAn, generates unit data, and calculates a compression parameter PAn+1 corresponding to the SB address range #n+1 based on the data before compression (S22). The compression parameter is calculated from the data before compression, which is the source of unit data written to all the storage locations of one SB address range SB #n.

If the write destination is the first storage location of the SB address range #n (Yes in S16), the compression/decompression circuit 46 writes the compression parameter PAn, which is calculated from the data before compression written to the SB address range #n−1, to the entry #n of the compression parameter table 72i (S24). After steps S14 or S24, the compression/decompression circuit 46 executes step S22 to compress the data and calculate the compression parameter.

The write controller 52 causes the ECC circuit 50 to add an error correction code to the unit data generated in S22, generate encoded data, and write the encoded data to the NAND flash memory 24.

Upon receiving a read request from the host 10, the read controller 54 converts the start LBA specified by the read request to an SB address using the address translation table 64. The read controller 54 reads the compressed data from the storage location of the NAND flash memory 24 specified by the SB address range including the SB address. The read controller 54 causes the ECC circuit 50 to correct an error in the compressed data. The read controller 54 reads the compression parameter from the entry corresponding to the SB address range of the compression parameter table 72 and decompresses the error-corrected compressed data using the compression parameter. The SSD 20 transmits the decompressed data to the host 10.

When data is erased from the superblock (that is, data is erased from the physical block), the compression parameter of the entry corresponding to an SB address range including the SB address of the erased data is not referenced. Thus, the memory system according to the first embodiment can perform the same process for the superblock as that for the superblock of a typical SSD.

The compression parameter table 72 may be stored in the NAND flash memory 24 instead of being entirely stored in the DRAM 26. In this case, not only the compressed data but also the compression parameter is read from the NAND flash memory 24. The DRAM 26 may be used as a cache for the compression parameter table 72.

According to the first embodiment, when the compression/decompression circuit 46 compresses data to be written to the SB address range #n of the superblock SBi using the compression parameter PAn, it obtains a compression parameter PAn+1 used to compress data to be written to the SB address range #n+1 of the superblock SBi. The data is written in the order of SB address ranges #n and #n+1. When the compression/decompression circuit 46 compresses a certain item of data, it obtains a compression parameter used for the next data to be compressed. Specifically, the compression/decompression circuit 46 calculates a compression parameter PAn+1 from data before compression (uncompressed data that is the source of the unit data) to be written to the SB address range #n of the superblock SBi. The compression parameter PAn+1 is used to compress data to be written to a subsequent address range #n+1. The compression parameter PAn+1 is written to the entry #n+1 of the compression parameter table 72i.

As described above, the compression/decompression circuit 46 obtains the compression parameter PAn+1 before it compresses the data to be written to the SB address range #n+1. It is therefore unnecessary to access to the data before compression twice, and the throughput is not reduced. The compression/decompression circuit 46 also obtains the compression parameter PAn+1 used to compress data to be written to the SB address range #n+1 from data written to the SB address range #n before compression. That is, the compression parameter is calculated from the data compressed immediately before the data to be compressed. Since a similarity between previously compressed data and data to be compressed is high, the compression parameter is suitable for data to be compressed. Thus, the compression/decompression circuit 46 can compress the uncompressed data with a high compression ratio.

In the memory system using the NAND flash memory 24, data needs to be written in order to consecutive storage locations in the superblock. Thus, no overhead increases even though unit data is written in order to consecutive storage locations as shown in FIG. 4.

In the foregoing descriptions, the compression/decompression circuit 46 calculates a compression parameter for compressing data to be written to the subsequent SB address range #n+1 of the superblock SBi from all data before compression to be written to the SB address range #n. If, however, the size of data to be written to the SB address range #n is large and the calculation time of the compression parameter is long, the generation of the compression parameter is not completed in time before the start of compression of data to be written to the subsequent SB address range #n+1, and the throughput of the compression process may be reduced.

To avoid this, the compression/decompression circuit 46 may calculate the compression parameter from part of data before compression, which is to be written to the SB address range #n. For example, the compression/decompression circuit 46 may calculate the compression parameter from data before compression, which is to be written to a part of a first half of the SB address range #n.

Alternatively, the compression/decompression circuit 46 may use all data before compression to be written to the SB address range #n to calculate a compression parameter for compressing data to be written to two or more subsequent SB address ranges instead of for compressing data to be written to the subsequent SB address ranges #n+1.

Second Embodiment

A second embodiment will be described below. The second embodiment is directed to a compression process that differs from that of the first embodiment. The compression process of the second embodiment will be described with reference to different points from the first embodiment.

FIG. 6 is a diagram illustrating an example of the compression process according to the second embodiment. Like FIG. 4, FIG. 6 shows the correspondence between the compression parameter table 72i and the compressed data stored in the SB address space of one superblock SBi of the NAND flash memory 24.

The number of entries of the compression parameter table 72i according to the second embodiment is 9, which is one more than the number of entries (8) of the compression parameter table 72i according to the first embodiment (FIG. 4). The size (128 bytes (128 B)) of the compression parameter in the second embodiment is ½ of the size (256 B) of the compression parameter in the first embodiment. The size (1 megabyte (1 MB)) of compressed data written to one SB address range in the second embodiment is ½ of the size (2 MB) of compressed data written to one SB address range in the first embodiment. The ratio between the size of the compression parameter in the second embodiment and the size of the compressed data written to one SB address range is equal to the ratio between the size of the compression parameter in the first embodiment and the size of the compressed data written to one SB address range.

The size of the compression parameter and the number of entries of the compression parameter table 72 is associated with the cost of the SSD 20.

The second embodiment is the same as the first embodiment with respect to calculation of the compression parameters and writing of the compression parameters to the compression parameter table 72i. From data before compression which is to be written to the SB address range #n of the superblock SBi, the compression/decompression circuit 46 calculates the compression parameter PAn+1 used to compress data written to the subsequent SB address range, such as #n+1. The compression parameter PAn+1 is written to the entry #n+1 of the compression parameter table 72i.

The second embodiment differs from the first embodiment in the selection of a compression parameter used to compress data. In the first embodiment, the compression parameter used to compress data written to the SB address range #n is the compression parameter PAn calculated from data before compression which is to be written to the SB address range #n−1. In the second embodiment, the compression parameter used to compress data written to the SB address range #n is the compression parameter PAn calculated from data before compression which is to be written to the SB address range #n−1 and the compression parameter PAn−1 calculated from data before compression which is to be written to a predetermined number of SB address ranges preceding the SB address range #n−1, such as the SB address range #n−2. As the number of compression parameters used for compression increases, the compression ratio improves. In the case of dictionary compression, if the number of compression parameters (initial dictionaries) is large, the possibility of compression increases and accordingly the compression ratio improves.

In the first embodiment, the compression parameter used to compress certain data is calculated from data before compression stored in the SB address at a maximum distance of 4 MB from the SB address of the certain data. In the second embodiment, the compression parameter used to compress certain data is calculated from data before compression stored in the SB address at a maximum distance of 3 MB from the SB address of the certain data. The compressed data are written to consecutive SB addresses. In the second embodiment, therefore, the compression parameters are calculated from the uncompressed data which is closer in time to data to be compressed than in the first embodiment. Thus, the compression parameter according to the second embodiment is more suitable for data to be compressed than the compression parameter according to the first embodiment. The compression ratio in the second embodiment is improved from the first embodiment.

In the example of FIG. 6, the size (128 B) of the compression parameter and the size (1 MB) of the compressed data written to one SB address range are respectively half of the size (256 B) of the compression parameter and the size (2 MB) of the compressed data written to one SB address range in the first embodiment. However, these sizes may be the same as those in the first embodiment. In this case, the compression ratio is improved because a compression parameter of a larger size is used. In the case of dictionary compression, if the size of the compression parameter (initial dictionary) is large, the possibility of compression increases, and the compression ratio improves.

FIG. 7 is a flowchart illustrating an example of a compression process in which the compression/decompression circuit 46 according to the second embodiment generates one item of unit data.

The flowchart of the compression process according to the second embodiment differs from that of the compression processes according to the first embodiment only in steps S14 and S22.

When the destination of data write is the first storage location of the first SB address range #0 of the superblock SBi (Yes in S12), the compression/decompression circuit 46 writes a default first compression parameter to the entry #−1 of the compression parameter table 72i and writes a default second compression parameter to the entry #0 of the compression parameter table 72i (S32). If unit data has been written to a superblock (e.g., SBj (j≠i)) before the unit data is written to another superblock SBi, a compression parameter determined during the process for the SB address range of the superblock SBj in which the unit data was last written, may be used as the default second compression parameter, and a compression parameter determined during the process for the SB address range of the superblock SBj in which the unit data was penultimately written, may be used as the default first compression parameter.

If the write destination is not the first storage location of the first SB address range #0 of the superblock SBi (No in S12), the compression/decompression circuit 46 determines whether the write destination is the first storage location (the leftmost storage location in the example of FIG. 6) of the SB address range #n (n=1-7) (S16).

If the write destination is not the first storage location of the SB address range #n (No in S16), the compression/decompression circuit 46 reads the compression parameter PAn from the entry #n of the compression parameter table 72i corresponding to the SB address range #n, reads the compression parameter PAn−1 from the entry #n−1 of the compression parameter table 72i, compresses the data using the compression parameters PAn and PAn−1, generates unit data, and calculates the compression parameter PAn+1 based on the data before compression (S34). The compression parameter is calculated from data before compression which is the source of unit data written to all storage locations of one SB address range SB #n.

If the write destination is the first storage location of the SB address range #n (Yes in S16), the compression/decompression circuit 46 writes the compression parameter PAn, which is calculated from the data before compression to be written to the SB address range #n−1, to the entry #n of the compression parameter table 72i (S24). After steps S32 or S24, the compression/decompression circuit 46 executes step S34 to compress the data and calculate the compression parameter.

In the compression process described above, two compression parameters are read respectively from two entries of the compression parameter table 72i and are used. The second embodiment can be modified to use three or more compression parameters and, in this case, the number of entries of the compression parameter table 72 is increased accordingly.

In the compression process according to the second embodiment, the compression parameters are calculated from the uncompressed data which are closer in time to the uncompressed data to be compressed than the compression process according to the first embodiment. The compression ratio is thus improved. In addition, the compression process according to the second embodiment uses a larger number of compression parameters or a larger size of compression parameter than the compression process according to the first embodiment. Thus, the compression ratio is also improved.

FIG. 8 is a diagram illustrating an example of a compression process according to a modification to the second embodiment.

The number of entries of the compression parameter table 72i according to the modification is 9, which is the same as the number of entries of the compression parameter table 72i according to the second embodiment. The size (32 bytes (32 B)) of the compression parameter in the modification is ¼ of the size (128 B) of the compression parameter in the second embodiment. The size 256 (kilobytes (256 KB)) of the compressed data written to one SB address range in the modification is ¼ of the size (1 MB) of the compressed data written to one SB address range in the second embodiment. The ratio between the size of the compression parameter and the size of the compressed data written to one SB address range in the modification is equal to the ratio between the size of the compression parameter and the size of the compressed data written to one SB address range in the second embodiment.

In the second embodiment, the number of compression parameters used to compress data is fixed. The compression parameters of entry #n corresponding to the SB address range #n in which data is written through a predetermined number of preceding entries are used. In the modification, all the compression parameters stored in the compression parameter table 72i are used.

For example, if data to be written to the first SB address range #0 is compressed, two compression parameters PA0 and PA−1 of entries #0 and #−1 of the compression parameter table 72i are used. If data to be written to the second SB address range #1 is compressed, three compression parameters PA1, PA0, and PA−1 of entries #1, #0, and #−1 of the compression parameter table 72i are used. If data to be written to the third SB address range #2 is compressed, four compression parameters PA2, PA1, PA0, and PA−1 of entries #2 to #−1 of the compression parameter table 72i are used.

The number of compression parameters used for compression in the modification is larger than that in the second embodiment. The compression ratio is therefore improved from that of the second embodiment.

Third Embodiment

A third embodiment will be described below. The third embodiment is directed to a compression process different from that of the first embodiment. The compression process of the third embodiment will be described with reference to different points from the first embodiment.

Figure 9:
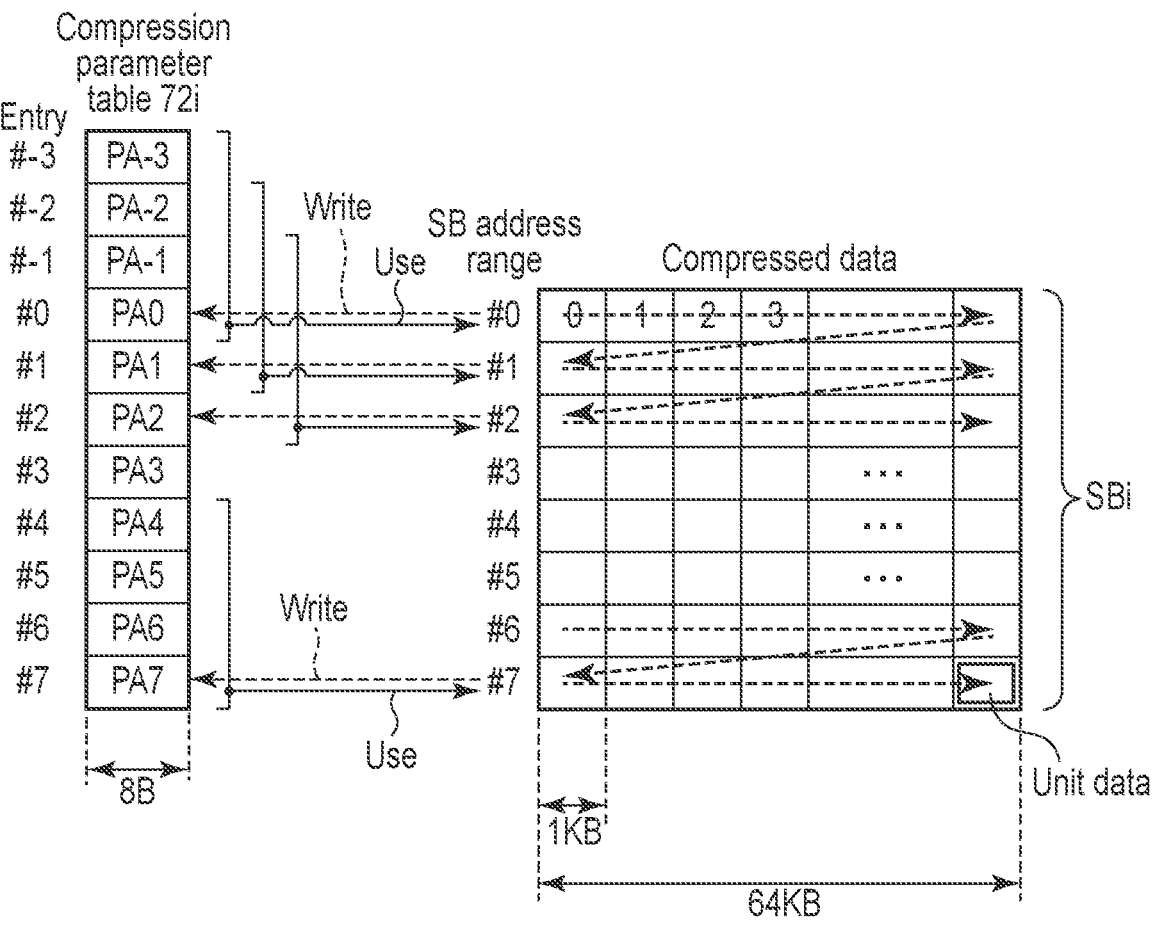
FIG. 9 is a diagram illustrating an example of the compression process according to the third embodiment.

FIG. 9 is a diagram illustrating an example of the compression process according to the third embodiment. Like FIG. 4, FIG. 9 shows the correspondence between the compression parameter table 72i and the compressed data stored in the SB address space of one superblock SBi of the NAND flash memory 24.

The number of entries of the compression parameter table 72i according to the third embodiment is 11, which is two more than the number of entries (9) of the compression parameter table 72i according to the modification (FIG. 8) to the second embodiment. The size (8 bytes (8 B)) of the compression parameter in the third embodiment is ¼ of the size (32 B) of the compression parameter in the modification to the second embodiment. The size (64 kilobytes (64 KB)) of the compressed data written to one SB address range in the third embodiment is ¼ of the size (256 KB) of the compressed data written to one SB address range in the modification to the second embodiment. The ratio between the size of the compression parameter and the size of the compressed data written to one SB address range in the third embodiment is equal to the ratio between the size of the compression parameter and the size of the compressed data written to one SB address range in the modification to the second embodiment.

The third embodiment differs from the first embodiment, the second embodiment, and the modification to the second embodiment in the calculation of the compression parameters and the writing of the compression parameters to the compression parameter table 72i. In the first and second embodiments and the modification to the second embodiment, a compression parameter used to compress data to be written to the SB address range #n is calculated from data before compression, which is to be written to an SB address range preceding the SB address range #n, such as the SB address range #n-1. That is, a compression parameter is calculated in advance based on data to be compressed before data to be compressed using the compression parameter.

In the third embodiment, the compression parameter PAn used to compress data written to the SB address range #n is calculated from all or part of the data before compression, which is to be written to the SB address range #n. Therefore, the compression parameters in the third embodiment are more suitable for data to be compressed than those in the first and second embodiments and the modification to the second embodiment. In the third embodiment, the compression ratio is further improved from the ratio in the first and second embodiments and the modification to the second embodiment.

The third embodiment is the same as the second embodiment with respect to the selection of compression parameters used to compress data. That is, in the third embodiment, the compression parameters for obtaining compressed data to be written to the SB address range #n are the compression parameter PAn calculated from data before compression, which is to be written to the SB address range #n, and the compression parameters PAn-1, PAn-2, and PAn-3 calculated from data before compression, which is to be written to a predetermined number of SB address ranges preceding the SB address range #n, such as the SB address ranges #n-1, #n-2, and #n-3.

In the third embodiment, the number of compression parameters used for compression is increased compared with the first and second embodiments and the modification to the second embodiment; thus, the compression ratio is improved.

In the third embodiment, data before compression, which is to be written to the SB address space #n, is analyzed, a compression parameter is created, and then the data is compressed using the compression parameter. Since data is accessed twice, the throughput is likely to be lower than that in the first and second embodiments and the modification to the second embodiment.

However, as shown in FIG. 9, the data size required for generating the compression parameter is relatively small size (64 KB), it is stored in not the DRAM 26 but the SRAM 44. Since the data is stored in the SRAM 44 inside the controller 22, data analysis, compression parameter generation, and compression process can be continuously executed without additional DRAM access.

If the uncompressed data is not stored in the SRAM 44 because its size is large, it is stored in the DRAM 26. Since the DRAM 26 is accessed twice, a high-speed DRAM I/F circuit 38 is required. This problem does not arise from the third embodiment.

FIG. 10 is a flowchart illustrating an example of a compression process in which the compression/decompression circuit 46 according to the third embodiment generates one item of unit data.

The flowchart of the compression process according to the third embodiment is similar to that of the compression process according to the second embodiment (FIG. 7), except that a compression parameter is calculated when data to be written to the first storage location of an SB address range is compressed.

The compression/decompression circuit 46 determines whether the write destination of data to be compressed is the first storage location of the first SB address range #0 of the superblock SBi (S12).

If the write destination is the first storage location of the first SB address range #0 of the superblock SBi (Yes in S12), the compression/decompression circuit 46 writes the default first compression parameter to the entry #−3 of the compression parameter table 72i, writes the default second compression parameter to an entry #−2 of the compression parameter table 72i, writes the default third compression parameter to an entry #−1 of the compression parameter table 72i, calculates the compression parameter PA0 based on data before compression to be written to the SB address range #0, and writes the compression parameter PA0 to the entry #0 of the compression parameter table 72i (S42).

If unit data has been written to other superblock (e.g., SBj (j≠i)) before unit data is written to superblock SBi, a compression parameter determined during the process for the SB address range of the former superblock SBj in which unit data was last written, may be used as the default third compression parameter. As the default second compression parameter, a compression parameter determined during the process for the SB address range of the superblock SBj in which unit data was penultimately written may be used. As the default first compression parameter, a compression parameter determined during the process for the SB address range of the superblock SBj in which the unit data is antepenultimately written may be used.

If the write destination is not the first storage location in the first SB address range #0 of the superblock SBi (No in S12), the compression/decompression circuit 46 determines whether the write destination is the first storage location in the SB address range #n (n=1-7) (S16).

If the write destination is the first storage location in the SB address range #n (Yes in S16), the compression/decompression circuit 46 calculates the compression parameter PAn based on data before compression to be written to the SB address range #n, and writes the compression parameter PAn to the entry #n of the compression parameter table 72i (S44).

If the write destination is not the first storage location of the SB address range #n (No in S16), the compression/decompression circuit 46 reads the compression parameter PAn from the entry #n of the compression parameter table 72i corresponding to the SB address range #n, reads the compression parameter PAn-1 from the entry #n-1 of the compression parameter table 72i, reads the compression parameter PAn-2 from the entry #n-2 of the compression parameter table 72i, reads the compression parameter PAn-3 from the entry #n-3 of the compression parameter table 72i, compresses the data using the compression parameters PAn, PAn-1, PAn-2, and PAn-3, and generates unit data (S46).

After step S42 or S44, the compression/decompression circuit 46 executes step S42 to compress the data.

The write controller 52 causes the ECC circuit 50 to add an error correction code to the unit data generated in S46 and generate encoded data and writes the encoded data to the NAND flash memory 24.

According to the third embodiment, the compression parameters are calculated from the data to be compressed; thus, the compression parameters are more suitable for the data to be compressed. Accordingly, the compression ratio is improved.

Fourth Embodiment

A fourth embodiment will be described below. The fourth embodiment is directed to a compression process different from that of the first embodiment. The compression process of the fourth embodiment will be described with reference to different points from the first embodiment.

In the above embodiments, the compression parameter corresponding to one SB address range is of a fixed size and stored in one entry of the compression parameter table 72. In the fourth embodiment, the size of the compression parameter corresponding to one SB address range is variable. The compression parameters of a variable size are stored in a variable number of entries of the compression parameter table 72. That is, the compression parameters are stored in any zero or more entries of the compression parameter table 72.

The size of the compression parameter may be 0 B. The fact that the size is 0 B means that the compression parameter is not stored in the compression parameter table 72. A compression parameter for data for which no compression effect is expected is not written to the compression parameter table 72i.

In the case of dictionary compression, if data to be compressed is similar to the previously compressed data, an effective initial dictionary is generated for the data to be compressed. However, there is no effective compression parameter for random data. The compression parameter for which a compression effect is expected is calculated with a large size and written to a number of entries of the compression parameter table 72. Accordingly, the compression ratio is improved.

FIG. 11 is a diagram illustrating an example of a compression process according to the fourth embodiment. Like FIG. 4, FIG. 11 shows the correspondence between the compression parameter table 72i and the compressed data stored in the SB address space of one superblock SBi of the NAND flash memory 24.

The number of entries of the compression parameter table 72i according to the fourth embodiment is 22. The size (4 bytes (4 B)) of the compression parameter in the fourth embodiment is ½ of the size (8 B) of the compression parameter in the third embodiment (FIG. 9). The size of compressed data written to one SB address range in the fourth embodiment is 64 KB, which is the same as the size of compressed data written to one SB address range in the third embodiment. The compression parameter table 72i stores one compression parameter of 88 (=4×22) bytes (88 B) at maximum.

The compression parameter in the fourth embodiment may be calculated from data (uncompressed data) compressed before compression of data to be compressed as in the first and second embodiments or may be calculated from data to be compressed itself as in the third embodiment.

One SB address range corresponds to eight consecutive entries of the compression parameter table 72i. The first SB address range #0 corresponds to eight entries #−6 to #1 of the compression parameter table 72i. The second SB address range #01 corresponds to eight entries #−4 to #3 of the compression parameter table 72i. The third SB address range #02 corresponds to eight entries #−2 to #5 of the compression parameter table 72i. Similarly, the eighth SB address range #07 corresponds to eight entries #8 to #15 of the compression parameter table 72i.

The compression/decompression circuit 46 writes the compression parameter to entries corresponding to each of the SB address ranges #0 to #7 of the compression parameter table 72i and to one or more of the entries, which correspond to the SB address ranges to which the preceding data are written, to which no compression parameters have been written.

The compression parameter PA0 corresponding to the first SB address range #0 can be stored in eight entries #−6 to #1 of the compression parameter table 72i. The maximum size of the compression parameter PA0 is 32 bytes.

If the compression parameter PA0 of data to be written to the SB address range #0 is 16 bytes, the compression/decompression circuit 46 writes four components PA0a, PA0b, PA0c, and PA0d of each 4 bytes of the compression parameter PA0 to their respective four entries #−6, #−5, #−4, and #−3 of the compression parameter table 72i immediately before compressing data to be written to the first storage location of the SB address range #0. No components of the compression parameter PA0 are written to four entries #−2, #−1, #0, and #1 among eight entries −6 # to #1 of the compression parameter table 72i corresponding to the SB address range #0.

The compression/decompression circuit 46 reads four compression parameter components PA0a to PA0d from their respective four entries #−6, #−5, #−4, and #−3 among eight entries #−6 to #3 of the compression parameter table 72i and compresses data using the compression parameter PA0.

The compression parameter PA1 corresponding to the second SB address range #1 can be written to eight entries #−2 to #3. The entry #−2 is subsequent to the entry #−3 to which the compression parameter component PA0d is written.

If the compression parameter PA1 of data to be written to the SB address range #1 is 12 bytes, the compression/decompression circuit 46 respectively writes three components PA1a, PA1b, and PA1c of each 4 bytes of the compression parameter PA1 to three entries #−2, #−1, and #0 of the compression parameter table 72i immediately before compressing data to be written to the first storage location of the SB address range #1. No components of the compression parameter PA1 are written to three entries #1, #2, and #3 among the eight entries #−4 to #3 of the compression parameter table 72i corresponding to the SB address range #1.

The compression/decompression circuit 46 respectively reads compression parameter components PA1a, PA1b, and PA1c from the three entries #−2, #−1, and #0 of the compression parameter table 72i and compresses data using the compression parameter PA1.

The compression parameter PA2 corresponding to the third SB address range #2 can be written to entries #1 to #1 to #5. The entry #1 is subsequent to the entry #0 to which the compression parameter component PA1c is written.

If the compression parameter PA2 of data to be written to the SB address range #2 is 4 bytes, the compression/decompression circuit 46 writes the compression parameter PA2 to the entry #1 of the compression parameter table 72i immediately before compressing data to be written to the first storage location of the SB address range #2. No components of the compression parameter are written to four entries #2, #3, #4 and #5 among eight entries #-2 to #5 of the compression parameter table 72*i* corresponding to the SB address range #2. The compression/decompression circuit 46 reads the compression parameter PA2 from the entry #1 of the compression parameter table 72*i* and compresses data using the compression parameter PA2.

The compression parameter PA3 corresponding to the fourth SB address range #3 can be written to entries #2 to #7. The entry #2 is subsequent to the entry #1 to which the compression parameter component PA2 is written.

If the compression parameter of data to be written to the SB address range #3 is 24 bytes, the compression/decompression circuit 46 respectively writes six components PA3*a*, PA3*b*, PA3*c*, PA3*d*, PA3*e*, and PA3*f* of each 4 bytes of the compression parameter PA3 to six entries #2, #3, #4, #5, #6, and #7 of the compression parameter table 72*i* immediately before compressing data to be written to the first storage location of the SB address range #3.

The compression/decompression circuit 46 reads components PA3*a* to PA3*f* from the six entries #2 to #7 of the compression parameter table 72*i* and compresses data using the compression parameter PA3.

According to the fourth embodiment, compression parameters having a variable size corresponding to the nature of data to be compressed are calculated and stored in a variable number of entries of the compression parameter table 72. If the size of compression parameter for data for which the effect of compression is not expected is decreased and the size of compression parameter for data for which the effect of compression is expected is increased, appropriate compression parameters can be applied to the entire data to be compressed and accordingly the compression ratio is improved.

Fifth Embodiment

A fifth embodiment will be described below. The fifth embodiment is directed to a compression process different from that of the first embodiment. The compression process of the fourth embodiment will be described with reference to different points from the first embodiment.

Figure 12:
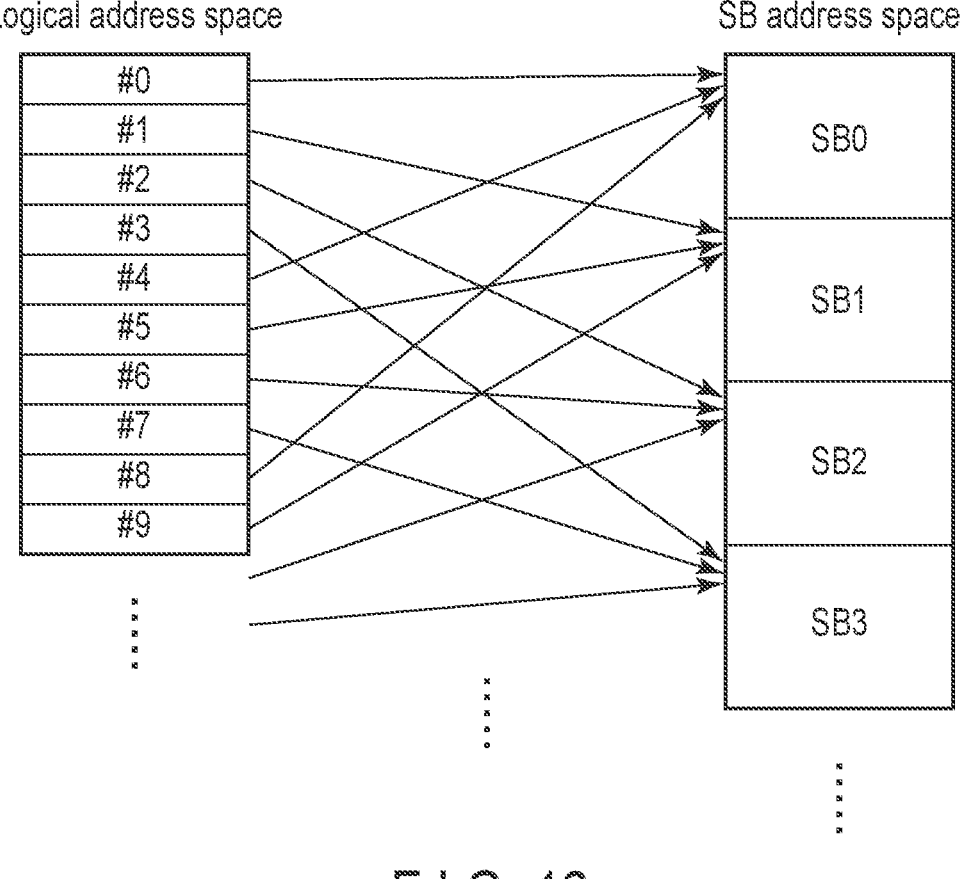
FIG. 12 shows an example of parallelization of address translation.

In the design of the SSD 20, flash memory control and address translation may be parallelized in order to increase the speed and level a degree of wear-out. FIG. 12 shows an example of parallelization of address translation. In this example, a logical address space that is visible from the host 10 and an SB address space are each divided based on their respective criteria. The logical address space is divided into logical addresses #0, #1, #2, . . . which correspond to data of a predetermined size, such as 1 MB. The SB address space is divided into a plurality of superblocks SB0, SB1, SB2 . . . . A plurality of logical addresses are translated into a single SB address. For example, logical addresses #0, #4, and #8 are translated into SB address ranges #0, #1, and #2 of the superblock SB0. Logical addresses #1, #5, and #9 are translated into SB address ranges #0, #1, and #2 of the superblock SB1. Logical addresses #0, #1, #2, and #3 are translated into an SB address range #0 of the superblocks SB0, SB1, SB2, and SB3. Thus, a first translation table for translating logical addresses into SB addresses can provide parallel address translation for each of the superblocks SB0, SB1, SB2, and SB3.

The logical address of data before compression, which is to be written to the SB address range #0 of the superblock SB0, is the logical address #0. The logical address of data before compression, which is to be written to the SB address range #1 of the superblock SB0, is the logical address #4. If a compression parameter is calculated according to the first and second embodiments, the compression parameter calculated from data before compression, which is to be written to the SB address range #0 of the superblock SB0, is used to compress data to be written to the subsequent SB address range #1 of the superblock SB0. That is, the logical addresses #0 and #4 corresponding to adjacent SB address ranges #0 and #1 are separated in the logical address space. Two items of data separated in the logical address space are less correlated with each other. If, therefore, data to be written to the SB address range #1 of the superblock SB0 is compressed using the compression parameter calculated from data before compression which is to be written to the SB address range #0 of the superblock SB0, the compression parameter may not be suitable for the data to be compressed, and the compression ratio may be reduced.

According to the fifth embodiment, in order to solve the above problem, even if a data compression process and a data write process are performed in parallel with respect to a plurality of superblocks, the compression/decompression circuit 46 calculates compression parameters and writes them to the compression parameter table 72 in accordance with the order of uncompressed data items transmitted from the host 10.

FIG. 13 is a diagram illustrating an example of calculation of compression parameter according to the fifth embodiment. The left side of the figure shows input data. The upper data is older (input in the past) and the lower data is newer (input recently). For example, SB0 or SB1 of the data input represents a superblock designated by SB address translated from the logical address of the data, that is, a superblock to which the compressed data is written.

At timing t1, the input of data before compression, which is to be written to the superblock SB3, is finished and the input of data before compression, which is to be written to the superblock SB0, starts. The compression/decompression circuit 46 writes the compression parameter calculated from data before compression, which is to be written to the superblock SB3, to the first entry in a free entry group of the compression parameter table 72 of the superblock SB0, such as entry #6, at timing t1.

At timing t2, the input of data before compression, which is to be written to the superblock SB0, is finished and the input of data before compression, which is to be written to the superblock SB1, starts. At timing t2, the compression/ decompression circuit 46 writes the compression parameter calculated from data before compression, which is to be written to the superblock SB0, to the first entry in a free entry group of the compression parameter table 72 of the superblock SB1, such as entry #0, at timing t2.

At timing t3, the input of data before compression, which is to be written to the superblock SB1, is finished and the input of data before compression, which is to be written to the superblock SB2, starts. The compression/decompression circuit 46 writes the compression parameter calculated from data before compression, which is to be written to the superblock SB1, to the first entry in a free entry group of the compression parameter table of the superblock SB2, such as entry #2, at timing t3.

At timing t4, the input of data before compression, which is to be written to the superblock SB2, is finished and the input of data before compression, which is to be written to the superblock SB1, starts. The compression/decompression circuit 46 writes the compression parameter calculated from data before compression, which is to be written to the superblock SB2, to the first entry in a free entry group of the compression parameter table of the superblock SB1, such as entry #1, at timing t4.

At timing t5, the input of data before compression, which is to be written to the superblock SB1, is finished and the input of data before compression, which is to be written to the superblock SB3, starts. The compression/decompression circuit 46 writes the compression parameter calculated from data before compression, which is to be written to the superblock SB1, to the first entry in a free entry group of the compression parameter table of the superblock SB3 at timing t5.

As described above, the compression/decompression circuit 46 calculates compression parameters according to the order of uncompressed data transmitted from the host 10. Since the compression parameters are calculated from data input at near time, the compression ratio is improved. Furthermore, as shown in FIG. 13, when data is written in the logical address order, the compression parameters are calculated from data close in the logical address space. Thus, an improvement in the compression ratio can be expected.

Sixth Embodiment

A sixth embodiment will be described below. The sixth embodiment is directed to a compression process different from that of the first embodiment. The compression process of the sixth embodiment will be described with reference to different points from the first embodiment.

In the SSD 20, garbage collection is performed. In the garbage collection, valid data is copied from a source superblock containing invalid data to another superblock, all data in the source superblock is erased, and the source superblock is reused as a new write destination block.

In the write process from the host, there may be latency or write buffer size requirements. In this write process, therefore, the use of a compression parameter calculated from data to be compressed as in the first and second embodiments to compress data next is effective in improving the compression ratio.

In the copy process of garbage collection, compressed data in the source superblock is read, decompressed, recompressed, and written to anther superblock. During compression and decompression, data is stored temporarily in the DRAM 26. Since data of a copy-source superblock is already made non-volatile, the latency requirement for the copy process is less than that for the write process from host. Therefore, a compression parameter calculated from data itself to be compressed as in the third embodiment may be used for data compression during garbage collection.

In the compression according to the sixth embodiment, a compression parameter is calculated at the same time when data is transferred from the NAND flash memory 24 to the DRAM 26. The calculated compression parameter may be used to compress data when the data is written from the DRAM 26 to the NAND flash memory 24. This control makes it possible to improve the performance and compression ratio with better balance.

A modification common to the above embodiments will be described.

An example of a compression parameter is an initial dictionary. An example of the initial dictionary is a character string that is a concatenation of data that occurs frequently, such as a frequently occurring character string. The compression/decompression circuit 46 includes a frequency table that stores a plurality of items of information in which the character string and the number of occurrences are paired.

In the process of calculating a compression parameter (S22 in FIG. 5, for example), the compression/decompression circuit 46 counts the matched character strings in the dictionary compression process to update the frequency table.

In the process of writing a compression parameter to the compression parameter table 72 (S24 in FIG. 5, for example), the compression/decompression circuit 46 refers to the frequency table to arrange the character strings in order of the number of occurrences and write the character strings to the entries of the compression parameter table 72 by the size of the compression parameter.

In the second to fourth embodiments, data is compressed based on the compression parameters of a plurality of entries. Some of the compression parameters for use in compressing data to be written to a certain SB address range are also used to compress data in the next SB address range subsequent to the certain SB address range.

When the compression/decompression circuit 46 writes the compression parameter for use in compressing data in the next SB address range to the compression parameter table, it does not write a part common to the compression parameter for use in compressing the data of the certain SB address range to the compression parameter table. Thus, the compression parameter table can store effective compression parameters without storing overlapping components of the compression parameters.

The example of the compression parameters is not limited to the initial dictionary, but the frequency information (for example, the Huffman table) of characters in entropy coding may be used as the compression parameters. In addition, a set of initial dictionaries and frequency information may be used as the compression parameters.

The compression parameters are not limited to those calculated from data to be compressed. A Logical address, access pattern, and the like may be added to the compression parameter as a sub-parameter. The access pattern includes a sequential access pattern and a random access pattern. Sequential access means accessing the physical blocks of the NAND flash memory 24 in the order of logical addresses. Random access means accessing the physical blocks of the NAND flash memory 24 in the order of random logical addresses. For example, in the second to fourth embodiments, a frequent logical address and the like may be stored in the entry of the compression parameter table 72 as a sub-parameter, together with the compression parameter of the initial dictionary. When data is compressed, a compression parameter of an entry in which a logical address close to the logical address of data to be compressed is stored as a sub-parameter among a plurality of compression parameters stored in an entry corresponding to a write destination, is used. If there is no sub-parameter close to the logical address of data to be compressed, a compression parameter of an entry having the majority sub-parameter from among a plurality of candidate entries corresponding to a write destination may be used or a compression parameter of the most recently used entry may be used. This control makes it possible to select a compression parameter with compression ratio improvement effects.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a first non-volatile memory including blocks, each of the blocks being a unit of erasing data; and
a controller configured to compress data and write the compressed data in the first non-volatile memory,
wherein:
the controller is configured to manage superblocks;
each of the superblocks corresponds to blocks which are operable in parallel;
each of the superblocks has superblock address ranges;
the controller includes a parameter table having entries which respectively correspond to the superblock address ranges of the superblocks;
the controller is configured to:
    translate a logical address of data to be written to the first non-volatile memory into a superblock address;
    calculate compression parameters which respectively correspond to items of data to be written to each of the superblock addresses of each of the superblocks based on the items of data;
    write the compression parameters to the parameter table; and
    compress first data whose write destination is included in a first superblock address range of a first superblock, using a first compression parameter;
the first compression parameter includes a compression parameter calculated based on second data written to a second superblock address range of the first superblock of the first non-volatile memory before the first data is written to the first superblock address range of the first superblock of the first non-volatile memory, and
the first superblock address range and the second superblock address range are not overlapped.

2. The memory system of claim 1, wherein the first compression parameter includes only the compression parameter calculated based on the second data.

3. The memory system of claim 1, wherein the first compression parameter further includes a compression parameter calculated based on the first data.

4. The memory system of claim 1, wherein:
the parameter table includes entries including a first entry and a second entry; and
the controller is configured to compress the first data using compression parameters written to the first entry and the second entry.

5. The memory system of claim 4, wherein the controller is configured to:
    write to the second entry a compression parameter calculated based on data written to the first non-volatile memory before the second data is written to the first non-volatile memory; and
    write to the first entry the compression parameter calculated based on the second data.

6. The memory system of claim 4, wherein the controller is configured to:
    write to the second entry the compression parameter calculated based on the second data; and
    write to the first entry the compression parameter calculated based on the first data.

7. The memory system of claim 1, wherein the controller is configured to use a compression parameter calculated based on data written to a second superblock before data is written to the first superblock, or a default compression parameter, as a compression parameter corresponding to a superblock address range in which the data is first written to the first superblock.

8. The memory system of claim 7, wherein the parameter table further includes an entry, the compression parameter calculated based on the data written to the second superblock or the default compression parameter being written to the entry.

9. The memory system of claim 1, wherein the first compression parameter includes all compression parameters calculated based on all data written to the first superblock.

10. The memory system of claim 1, wherein the second data comprises plural items of data, and the first compression parameter includes a predetermined number of compression parameters calculated based on the plural items of data written to the first non-volatile memory before the first data is written to the first non-volatile memory.

11. The memory system of claim 1, wherein the controller is configured to write one of compression parameters, which respectively correspond to the superblock address ranges, to an entry in the parameter table, respectively.

12. The memory system of claim 1, wherein the controller is configured to write compression parameters, which respectively correspond to the superblock address ranges, to entries in the parameter table, respectively.

13. The memory system of claim 1, wherein the first compression parameter includes a compression parameter calculated based on third data input to the memory system before the first data is input to the memory system.

14. The memory system of claim 1, wherein:
if data transmitted from a host is written to the first non-volatile memory, the first compression parameter includes no compression parameter calculated based on the data transmitted from the host; and
if data is written to the first non-volatile memory by a garbage collection, the first compression parameter includes a compression parameter calculated based on the data written to the first non-volatile memory by the garbage collection.

15. The memory system of claim 1, further comprising a second memory configured to temporarily store data, wherein:
the controller is configured to:
    calculate the first compression parameter when transferring the first data from the first non-volatile memory to the second memory; and
    compress the first data using the first compression parameter when transferring the first data from the second memory to the first non-volatile memory.

16. The memory system of claim 1, wherein
the compression parameter includes a sub-parameter indicating whether an access pattern of the first non-volatile memory is a sequential access pattern or a random access pattern; and
the sub-parameter includes frequency information of a logical address of the compressed data for a period of time during which the compressed data is written to the first non-volatile memory.

17. The memory system of claim 1, wherein the controller is configured to compress the first data using a compression parameter having an access pattern closest to an access pattern of the first data among the compression parameters stored in the parameter table.

18. The memory system of claim 1, wherein the controller is configured to compress the first data using a compression parameter having a largest number of sub-parameters among the compression parameters stored in the parameter table.

19. The memory system of claim 1, wherein each of the compression parameters includes an initial dictionary used for dictionary compression or frequency information used for entropy encoding.

20. A method for compressing data to be written to a non-volatile memory including blocks, each of the blocks being a unit of erasing data, the method comprising:

respectively corresponding superblocks to blocks which are operable in parallel;

respectively corresponding superblock address ranges to superblocks;

managing a parameter table having entries which respectively correspond to the superblock address ranges of the superblocks;

translating a logical address of data to be written to the non-volatile memory into a superblock address;

calculating compression parameters which respectively correspond to items of data to be written to the super-block addresses of the superblocks;

writing the compression parameters to the parameter table; and compressing first data whose write destination is included in a first superblock address range of a first superblock, using a first compression parameter, wherein the first compression parameter includes a compression parameter calculated based on second data written to a second superblock address range of the first superblock before the first data is written to the first superblock address range of the first superblock, and the first superblock address range and the second super-block address range are not overlapped.

* * * * *